(12) United States Patent
Kurian et al.

(10) Patent No.: US 10,613,777 B2
(45) Date of Patent: Apr. 7, 2020

(54) ENSURING INFORMATION SECURITY IN DATA TRANSFERS BY UTILIZING DECOY DATA

(71) Applicant: Bank of America Corporation, Charlotte, NC (US)

(72) Inventors: Manu Kurian, Dallas, TX (US); Sorin N. Cismas, Southlake, TX (US)

(73) Assignee: Bank of America Corporation, Charlotte, NC (US)

( * ) Notice: Subject to any disclaimer, the term of this patent is extended or adjusted under 35 U.S.C. 154(b) by 107 days.

(21) Appl. No.: 15/651,140

(22) Filed: Jul. 17, 2017

(65) Prior Publication Data

US 2017/0315744 A1 Nov. 2, 2017

Related U.S. Application Data

(63) Continuation-in-part of application No. 14/710,813, filed on May 13, 2015, now Pat. No. 9,811,279.

(51) Int. Cl.
*G06F 12/02* (2006.01)
*G06F 3/06* (2006.01)
(Continued)

(52) U.S. Cl.
CPC ............ *G06F 3/0623* (2013.01); *G06F 3/067* (2013.01); *G06F 3/0622* (2013.01);
(Continued)

(58) Field of Classification Search
None
See application file for complete search history.

(56) References Cited

U.S. PATENT DOCUMENTS 5,548,648 A 8/1996 Yorke-Smith
6,085,321 A 7/2000 Gibbs et al.
(Continued)

OTHER PUBLICATIONS

Feb. 2, 2017 U.S. Non-Final Office Action—U.S. Appl. No. 14/710,813.
(Continued)

*Primary Examiner* — Charles Rones
*Assistant Examiner* — Ryan Dare
(74) *Attorney, Agent, or Firm* — Banner & Witcoff, Ltd.; Michael A. Springs

(57) ABSTRACT

Aspects of the disclosure relate to ensuring information security in data transfers by utilizing decoy data. A computing platform may receive, from a data source computing device, a source data collection for a secure physical-storage-media data transfer and may identify one or more transmission parameters associated with the secure physical-storage-media data transfer. Subsequently, the computing platform may generate decoy data and may produce a secure dataset for the secure physical-storage-media data transfer by combining the decoy data with the source data collection received from the data source computing device. Then, the computing platform may encrypt the secure dataset based on the one or more transmission parameters to produce an encrypted dataset for the secure physical-storage-media data transfer. After encrypting the secure dataset based on the one or more transmission parameters to produce the encrypted dataset, the computing platform may store the encrypted dataset on one or more physical media.

17 Claims, 14 Drawing Sheets

(51) Int. Cl.
  *G06F 21/78* (2013.01)
  *G06F 21/00* (2013.01)
  *G06F 21/62* (2013.01)
  *G06F 21/60* (2013.01)

(52) U.S. Cl.
  CPC .......... *G06F 3/0629* (2013.01); *G06F 3/0659* (2013.01); *G06F 3/0683* (2013.01); *G06F 21/00* (2013.01); *G06F 21/606* (2013.01); *G06F 21/62* (2013.01); *G06F 21/6209* (2013.01); *G06F 21/78* (2013.01)

(56) References Cited

U.S. PATENT DOCUMENTS

| | | |
|---|---|---|
| 6,357,006 B1 | 3/2002 | Pham et al. |
| 6,490,353 B1 | 12/2002 | Tan |
| 6,795,919 B1 | 9/2004 | Gibbs et al. |
| 6,874,092 B1 | 3/2005 | Motoyama et al. |
| 7,155,605 B1 | 12/2006 | Cromer et al. |
| 7,254,232 B2 | 8/2007 | DiSanto et al. |
| 7,373,520 B1 | 5/2008 | Borthakur et al. |
| 7,457,952 B2 | 11/2008 | Rogriguez et al. |
| 7,460,672 B2 | 12/2008 | Klein |
| 7,523,315 B2 | 4/2009 | Hougaard et al. |
| 7,650,499 B2 | 1/2010 | Ittogi |
| 7,694,126 B2 | 4/2010 | Miyazaki et al. |
| 7,756,926 B2 | 7/2010 | Tseng et al. |
| 7,995,754 B2 | 8/2011 | Gabryjelski et al. |
| 8,122,255 B2 | 2/2012 | Merrill |
| 8,189,769 B2 | 5/2012 | Ramasamy et al. |
| 8,224,851 B2 | 7/2012 | Banda et al. |
| 8,296,584 B2 | 10/2012 | Bosch et al. |
| 8,375,233 B2 | 2/2013 | Bourdelles |
| 8,548,164 B2 | 10/2013 | Nourry et al. |
| 8,559,630 B2 | 10/2013 | Ramasamy et al. |
| 8,635,465 B1 | 1/2014 | Juels et al. |
| 8,656,173 B2 | 2/2014 | Yoshioka et al. |
| 8,826,026 B2 | 9/2014 | Mergen et al. |
| 9,152,808 B1* | 10/2015 | Ramalingam .......... G06F 21/62 |
| 2006/0236053 A1 | 10/2006 | Shiga et al. |
| 2006/0274856 A1* | 12/2006 | Dunn ................... H04K 1/00 375/316 |
| 2008/0183992 A1* | 7/2008 | Martin ............... G06F 11/1456 711/162 |
| 2009/0138517 A1 | 5/2009 | McLain et al. |
| 2009/0328218 A1 | 12/2009 | Tsurukawa |
| 2010/0312810 A1 | 12/2010 | Horton et al. |
| 2011/0307705 A1* | 12/2011 | Fielder .................. G06F 21/62 713/181 |
| 2013/0145112 A1 | 6/2013 | Foster et al. |
| 2014/0297423 A1 | 10/2014 | Tseng et al. |
| 2015/0271255 A1* | 9/2015 | Mackay ................ H04L 67/101 709/226 |
| 2017/0177883 A1* | 6/2017 | Paterra ................. G06F 21/606 |

OTHER PUBLICATIONS

Aug. 22, 2017 U.S. Notice of Allowance—U.S. Appl. No. 14/710,813.
Klinc, Demijan et al., "On Compression of Data Encrypted with Block Ciphers," 2010, retrieved from https://eprint.iacr.org/2010/477.pdf, 27 pages.
Kak, Avi, "Lecture 3: Block Ciphers and the Data Encryuption Standard—Lecture Notes on "Computer and Network Security"," Jan. 21, 2017, downloaded from https://zapdoc.tips/lecture-3-block-ciphers-and-the-data-encryption-standard-lec.html, 46 pages.
Jan. 9, 2019 U.S. Notice of Allowance—U.S. Appl. No. 15/651,085.

* cited by examiner

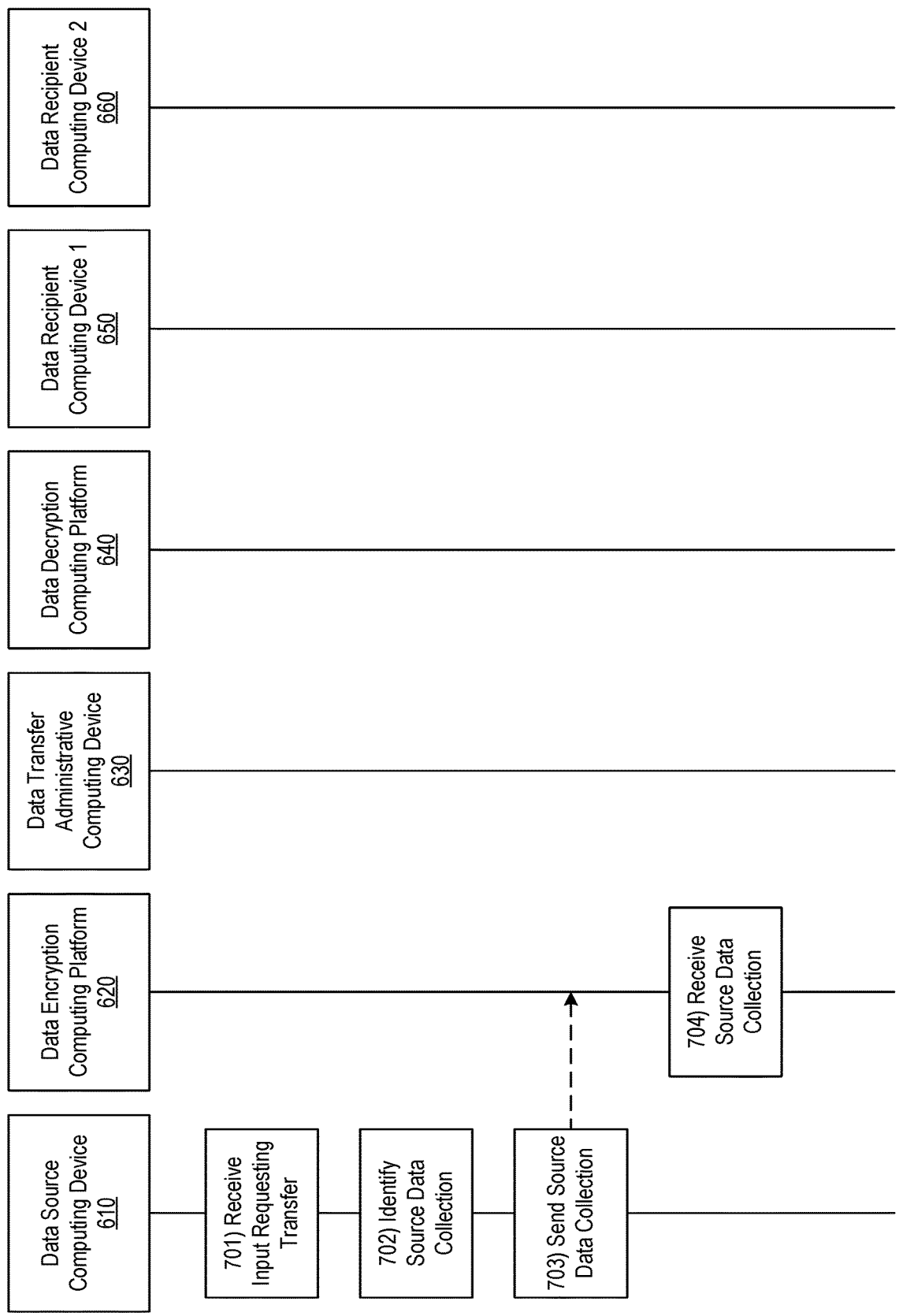

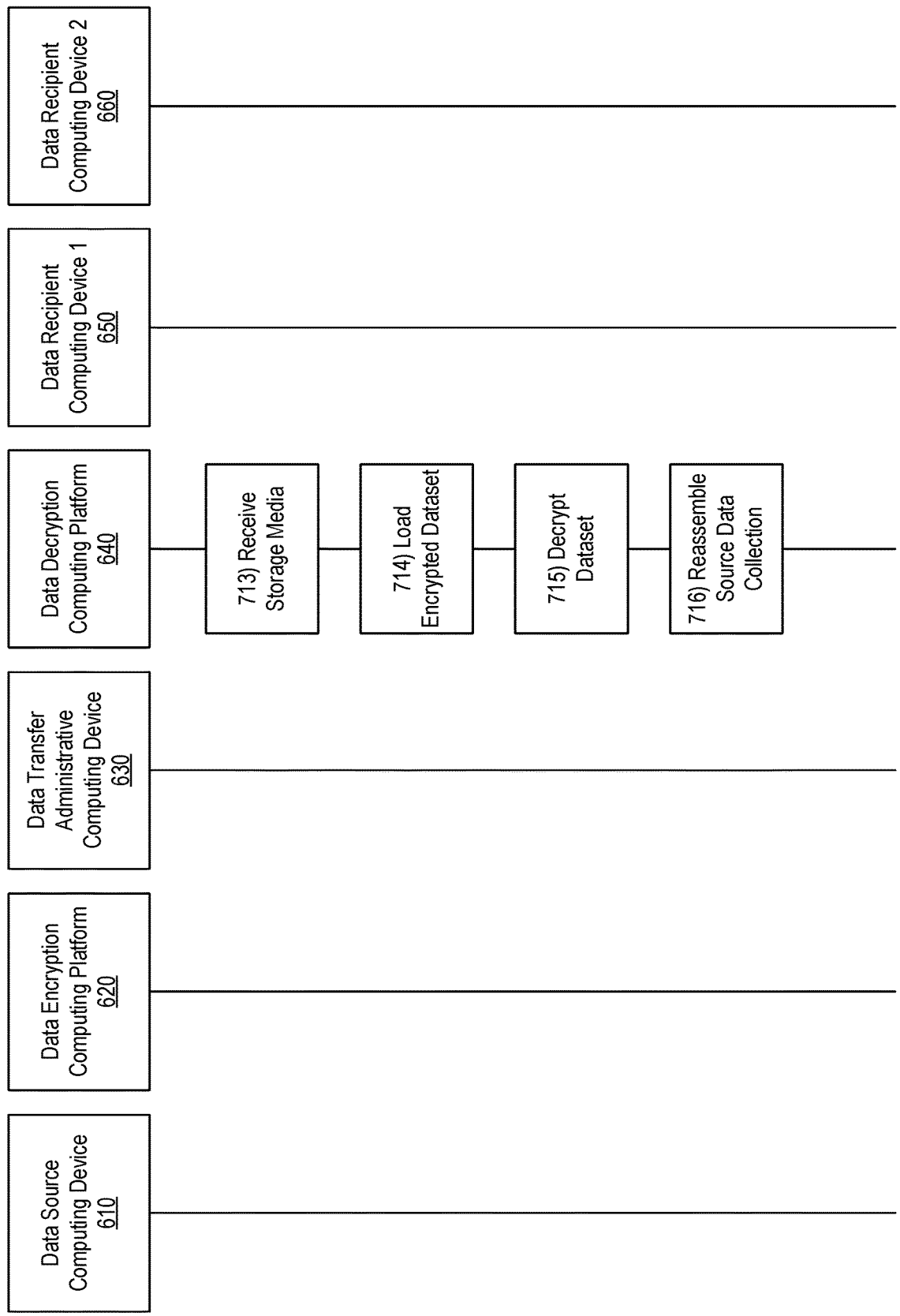

ENSURING INFORMATION SECURITY IN DATA TRANSFERS BY UTILIZING DECOY DATA

CROSS-REFERENCE TO RELATED APPLICATION(S)

This application is a continuation-in-part of and claims the benefit of priority to U.S. patent application Ser. No. 14/710,813, filed May 13, 2015, and entitled "SECURING PHYSICAL-STORAGE-MEDIA DATA TRANSFERS," which is hereby incorporated by reference in its entirety for all purposes.

BACKGROUND

While improvements in computer networking have diminished the need for transferring computer data via physical storage media, transferring data via physical storage media continues to be preferable for certain types of data transfers. For example, certain data transfers may be too large for efficient network transfer. Additionally, data transfers may involve confidential, sensitive, or proprietary information, and transferring such data via physical storage media may prove more secure than available network-transfer alternatives. Similarly, certain types of third-party data transfers may be required to be made via physical storage media (e.g., regulatory submissions, discovery productions, and the like). Thus, while many organizations appreciate that there are data-leakage risks associated with providing users of their computing systems with the ability to transfer data via physical storage media, they also recognize that a need exists to provide at least some users of their computing systems with the ability to transfer data via physical storage media but desire to secure such physical-storage-media data transfers. Accordingly, a need exists for securing physical-storage-media data transfers.

SUMMARY

The following presents a simplified summary in order to provide a basic understanding of some aspects of the disclosure. This summary is not an extensive overview of the disclosure. It is intended neither to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome technical problems associated with securing physical-storage-media data transfers. For example, some aspects of the disclosure relate to ensuring information security in data transfers. In some embodiments, source data may be combined with bulk decoy data prior to being encrypted and/or transferred to a recipient. The source data then may be sent to the recipient in a bulk convoy using physical media and/or using cloud-based data transmission techniques. In some instances, a data noise generator may be provided to create the bulk decoy data. Aspects of the disclosure enhance information security because it may be more difficult to crack a large amount of encrypted data using brute force techniques than a smaller amount of data. In some instances, the sender and the recipient may agree in advance as to what data is decoy data and what data is real data. Additionally or alternatively, the decoy data may be configured to identify itself as such, and/or a catalog may be provided in metadata to identify the real data.

In accordance with one or more embodiments, a computing system may receive physical-storage-media identifiers stored on physical storage media approved for use by an organization. The computing system may generate, for each of the physical storage media, a log entry comprising a physical-storage-media identifier, of the physical-storage-media identifiers, stored on the physical storage medium. The computing system may receive, from a computing device, a request to write secure data to a physical storage medium. Responsive to determining that the request comprises a physical-storage-media identifier that is amongst the physical-storage-media identifiers: the computing system may either instruct the computing device to write the secure data to the physical storage medium or fail to instruct the computing device to write the secure data to the physical storage medium; and may update a log entry comprising the physical-storage-media identifier to reflect whether the computing system instructed the computing device to write the secure data to the physical storage medium.

For example, in some embodiments, the computing system may receive physical-storage-media identifiers stored on physical storage media approved for use by an organization associated with the computing system. For each physical storage medium of the physical storage media approved for use by the organization, the computing system may generate, in a log stored in a memory of the computing system, an entry comprising a physical-storage-media identifier, of the physical-storage-media identifiers, stored on the physical storage medium. The computing system may receive, from a first computing device, a request to write a first portion of secure data stored in the memory of the computing system to a first physical storage medium and may receive, from a second computing device, a request to write a second portion of the secure data to a second physical storage medium. The computing system may determine that the request to write the first portion of the secure data to the first physical storage medium comprises a first physical-storage-media identifier that is amongst the physical-storage-media identifiers and may determine that the request to write the second portion of the secure data to the second physical storage medium comprises a second physical-storage-media identifier that is amongst the physical-storage-media identifiers.

Responsive to determining that the request to write the first portion of the secure data to the first physical storage medium comprises the first physical-storage-media identifier, the computing system may instruct the first computing device to write the first portion of the secure data to the first physical storage medium and may update an entry, of the log stored in the memory, comprising the first physical-storage-media identifier to reflect that the computing system instructed the first computing device to write the first portion of the secure data to the first physical storage medium. Responsive to determining that the request to write the second portion of the secure data to the second physical storage medium comprises the second physical-storage-media identifier, the computing system may fail to instruct the second computing device to write the second portion of the secure data to the second physical storage medium and may update an entry, of the log stored in the memory, comprising the second physical-storage-media identifier to reflect that the computing system failed to instruct the second computing device to write the second portion of the secure data to the second physical storage medium.

In some embodiments, the computing system may determine, based on the second physical-storage-media identifier, that the second physical storage medium has been tampered with and may fail to instruct the second computing device to write the second portion of the secure data to the second physical storage medium in response to determining that the second physical storage medium has been tampered with. For example, in some embodiments, generating the entry comprising the physical-storage-media identifier may comprise generating an entry comprising one or more properties of the physical storage medium (e.g., a number of times the physical storage medium has been written to, an available amount of storage on the physical storage medium, a total storage capacity of the physical storage medium, a manufacture of the physical storage medium, a number of times that the physical-storage-media identifier has been read from the physical storage medium, or the like), and the request to write the second portion of secure data stored in the memory to the second physical storage medium may comprise one or more properties of the second physical storage medium (e.g., a number of times the second physical storage medium has been written to, an available amount of storage on the second physical storage medium, a total storage capacity of the second physical storage medium, a manufacture of the second physical storage medium, a number of times that the second physical-storage-media identifier has been read from the second physical storage medium, or the like). In such embodiments, the computing system may determine that the second physical storage medium has been tampered with by identifying, in the log stored in the memory, an entry comprising the second physical-storage-media identifier and determining that the entry comprises one or more properties that are different from the one or more properties of the second physical storage medium. Additionally or alternatively, the computing system may determine that a portion of the secure data has previously been written to a different physical storage medium comprising the second physical-storage-media identifier.

In some embodiments, responsive to determining that the request to write the second portion of the secure data stored in the memory to the second physical storage medium comprises the second physical-storage-media identifier, the computing system may generate, based on the entry comprising the second physical-storage-media identifier, a message indicating that that the computing system failed to instruct the second computing device to write the second portion of the secure data to the second physical storage medium and may communicate the message to a computing device associated with a physical-storage-media administrator of the organization.

In some embodiments, the computing system may write, to each physical storage medium of the physical storage media approved for use by the organization, a different physical-storage-media identifier of the physical-storage-media identifiers. For example, in some embodiments, the physical storage media approved for use by the organization may include optical media, and the computing system may write, for each optical medium of the optical media, a different physical-storage-media identifier of the physical-storage-media identifiers to the optical medium. In some embodiments, each of the optical media may include a portion reserved for physical-storage-media identifiers associated with the physical storage media approved for use by the organization, and the computing system may write the different physical-storage-media identifier to the portion of the optical medium reserved for physical-storage-media identifiers associated with the physical storage media approved for use by the organization. In some embodiments, the computing system may write the physical-storage-media identifier to the optical medium, during a first optical-media-writing session for the optical medium. In such embodiments, responsive to the computing system instructing a computing device to write a portion of the secure data to the optical medium, the computing device may write the portion of the secure data to the optical medium during a second optical-media-writing session for the optical medium.

Additionally or alternatively, the physical storage media approved for use by the organization may include solid-state-memory devices, and the computing system may write, for each solid-state-memory device of the solid-state-memory devices, a different physical-storage-media identifier of the physical-storage-media identifiers to the solid-state-memory device. In some embodiments, each of the solid-state-memory devices may include a portion (e.g., a physically and/or logically separate memory, or the like) reserved for physical-storage-media identifiers associated with the physical storage media approved for use by the organization. In such embodiments, the computing system may write the different physical-storage-media identifier to the portion of the solid-state-memory device reserved for physical-storage-media identifiers associated with the physical storage media approved for use by the organization.

In some embodiments, the computing system may configure each physical storage medium of the physical storage media approved for use by the organization to prevent the portion of the physical storage medium reserved for physical-storage-media identifiers associated with physical storage media approved for use by the organization from being displayed in a user-viewable portion of an operating system file system.

In accordance with one or more additional embodiments, a computing platform having at least one processor, a communication interface, and memory may receive, via the communication interface, from a data source computing device, a source data collection for a secure physical-storage-media data transfer. Based on receiving the source data collection for the secure physical-storage-media data transfer from the data source computing device, the computing platform may identify one or more transmission parameters associated with the secure physical-storage-media data transfer. Subsequently, the computing platform may generate decoy data for the secure physical-storage-media data transfer based on the one or more transmission parameters associated with the secure physical-storage-media data transfer. Thereafter, the computing platform may produce a secure dataset for the secure physical-storage-media data transfer by combining the decoy data generated for the secure physical-storage-media data transfer and the source data collection received from the data source computing device. Then, the computing platform may encrypt the secure dataset based on the one or more transmission parameters associated with the secure physical-storage-media data transfer to produce an encrypted dataset for the secure physical-storage-media data transfer. After encrypting the secure dataset based on the one or more transmission parameters associated with the secure physical-storage-media data transfer to produce the encrypted dataset for the secure physical-storage-media data transfer, the computing platform may store the encrypted dataset on one or more physical media.

In some embodiments, based on storing the encrypted dataset on the one or more physical media, the computing platform may generate a notification indicating that the one or more physical media are ready to be transferred to a destination system. Subsequently, the computing platform may send, via the communication interface, to a data transfer administrative computing device, the notification indicating that the one or more physical media are ready to be transferred to the destination system to initiate a physical transfer of the one or more physical media.

In some embodiments, the one or more transmission parameters associated with the secure physical-storage-media data transfer may specify a quantity of physical media to be used in the secure physical-storage-media data transfer. In some embodiments, the one or more transmission parameters associated with the secure physical-storage-media data transfer may specify an encryption method to be used in the secure physical-storage-media data transfer.

In some embodiments, producing the secure dataset for the secure physical-storage-media data transfer may include adding one or more header tags to the decoy data generated for the secure physical-storage-media data transfer. In addition, the one or more header tags may identify the decoy data generated for the secure physical-storage-media data transfer as noise data to be discarded by a data decryption computing platform when decrypting the encrypted dataset stored on the one or more physical media.

In some embodiments, producing the secure dataset for the secure physical-storage-media data transfer may include adding a catalog to the secure dataset. In addition, the catalog may identify the decoy data generated for the secure physical-storage-media data transfer as noise data to be discarded by a data decryption computing platform when decrypting the encrypted dataset stored on the one or more physical media.

In some embodiments, producing the secure dataset for the secure physical-storage-media data transfer may include inserting the decoy data generated for the secure physical-storage-media data transfer at one or more predetermined locations in the secure dataset based on specifications associated with a predetermined recipient of the one or more physical media.

In some embodiments, storing the encrypted dataset on the one or more physical media may include storing the encrypted dataset on one or more compact discs. In some embodiments, storing the encrypted dataset on the one or more physical media may include storing the encrypted dataset on one or more flash drives. In some embodiments, storing the encrypted dataset on the one or more physical media may include storing the encrypted dataset on one or more hard drives. In some embodiments, storing the encrypted dataset on the one or more physical media may include storing the encrypted dataset on one or more magnetic tapes.

In some embodiments, storing the encrypted dataset on the one or more physical media may include storing different portions of the encrypted dataset on two or more separately shippable physical media. In addition, the different portions of the encrypted dataset stored on the two or more separately shippable physical media may be configured to be decrypted and reassembled into the source data collection by a data decryption computing platform.

Other details and features will be described in the sections that follow.

BRIEF DESCRIPTION OF THE DRAWINGS

The present disclosure is pointed out with particularity in the appended claims. Features of the disclosure will become more apparent upon a review of this disclosure in its entirety, including the drawing figures provided herewith.

Some features herein are illustrated by way of example, and not by way of limitation, in the figures of the accompanying drawings, in which like reference numerals refer to similar elements, and wherein:

FIGS. 7A, 7B, 7C, 7D, and 7E depict an illustrative event sequence for ensuring information security in data transfers by utilizing decoy data in accordance with one or more example embodiments;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Figure 1:
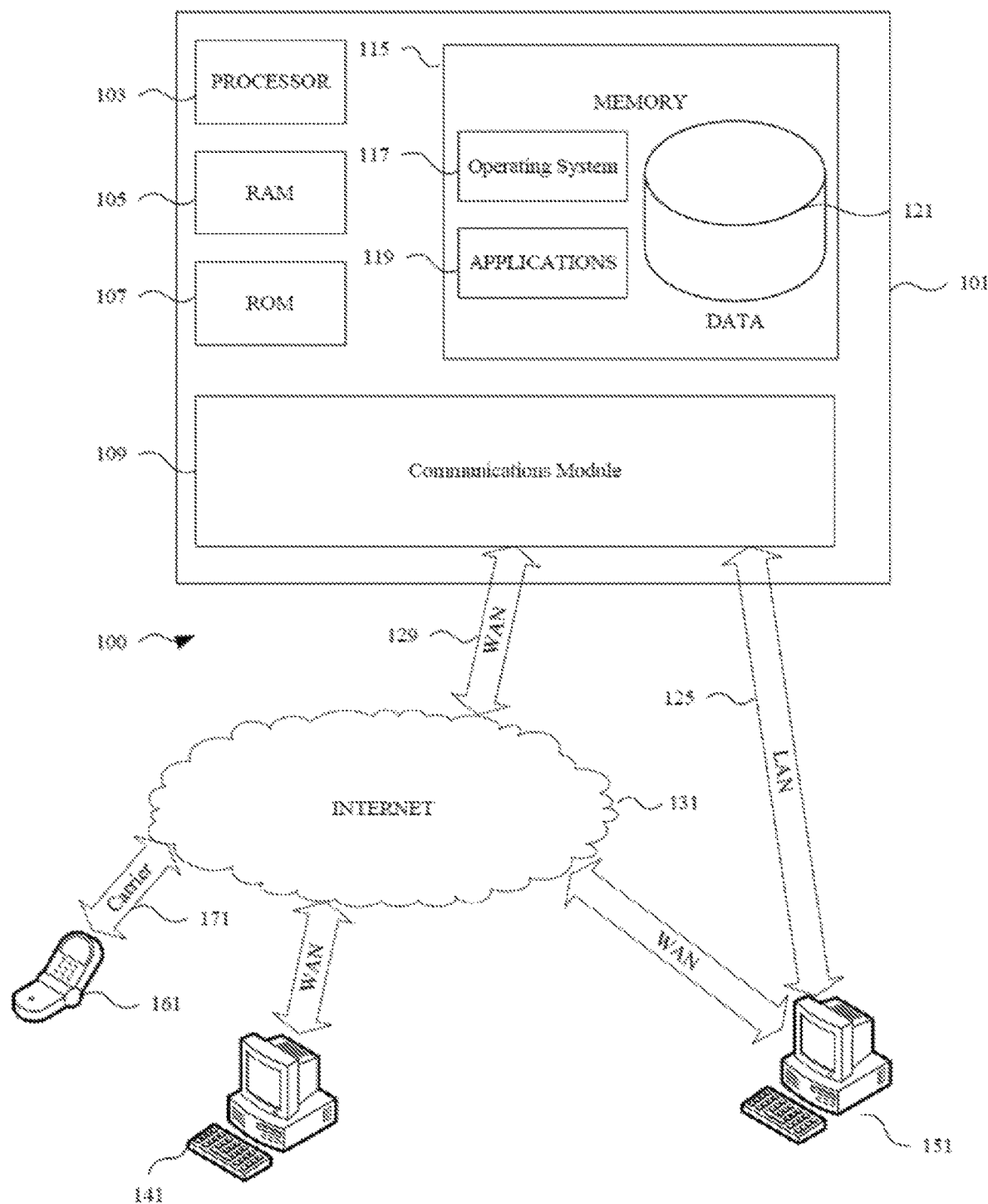
FIG. 1 depicts an illustrative operating environment in which various aspects of the present disclosure may be implemented in accordance with one or more example embodiments.

FIG. 1 depicts an illustrative operating environment in which various aspects of the present disclosure may be implemented in accordance with one or more example embodiments. Referring to FIG. 1, computing system environment 100 may be used according to one or more illustrative embodiments. Computing system environment 100 may include computing device 101 having processor 103 for controlling overall operation of computing device 101 and its associated components, including random-access memory (RAM) 105, read-only memory (ROM) 107, communications module 109, and memory 115. Computing device 101 may include a variety of computer readable media. Computer readable media may be any available media that may be accessed by computing device 101, may be non-transitory, and may include volatile and nonvolatile, removable and non-removable media implemented in any method or technology for storage of information such as computer-readable instructions, object code, data structures, program modules, or other data. Examples of computer readable media may include random access memory (RAM), read only memory (ROM), electronically erasable programmable read only memory (EEPROM), flash memory or other memory technology, compact disk read-only memory (CD-ROM), digital versatile disks (DVD) or other optical disk storage, magnetic cassettes, magnetic tape, magnetic disk storage or other magnetic storage devices, or any other medium that can be used to store the desired information and that can be accessed by computing device 101.

In some instances, some aspects described herein may be embodied as a method, a data processing system, or as a computer-readable medium storing computer-executable instructions. For example, a computer-readable medium storing instructions to cause a processor to perform steps of a method in accordance with aspects of the disclosed embodiments is contemplated. For example, aspects of the method steps disclosed herein may be executed on a processor on computing device 101. Such a processor may execute computer-executable instructions stored on a computer-readable medium.

Software may be stored within memory 115 and/or storage to provide instructions to processor 103 for enabling computing device 101 to perform various functions. For example, memory 115 may store software used by computing device 101, such as operating system 117, application programs 119, and associated database 121. Also, some or all of the computer executable instructions for computing device 101 may be embodied in hardware or firmware.

Although not shown, RAM 105 may include one or more applications representing the application data stored in RAM 105 while computing device 101 is on and corresponding software applications (e.g., software tasks), are running on computing device 101.

Communications module 109 may include a microphone, keypad, touch screen, and/or stylus through which a user of computing device 101 may provide input, and may also include one or more of a speaker for providing audio output and a video display device for providing textual, audiovisual and/or graphical output. Computing system environment 100 may also include optical scanners.

Computing device 101 may operate in a networked environment supporting connections to one or more remote computing devices, such as computing devices 141, 151, and 161. Computing devices 141, 151, and 161 may be personal computing devices or servers that include any or all of the elements described above relative to computing device 101. Computing device 161 may be a mobile device (e.g., smart phone) communicating over wireless carrier channel 171.

The network connections depicted in FIG. 1 may include local area network (LAN) 125 and wide area network (WAN) 129, as well as other networks. When used in a LAN networking environment, computing device 101 may be connected to LAN 125 through a network interface or adapter in communications module 109. When used in a WAN networking environment, computing device 101 may include a modem in communications module 109 or other means for establishing communications over WAN 129, such as Internet 131 or other type of computer network. The network connections shown are illustrative and other means of establishing a communications link between the computing devices may be used. Various protocols such as transmission control protocol/Internet protocol (TCP/IP), Ethernet, file transfer protocol (FTP), hypertext transfer protocol (HTTP) and the like may be used, and the system can be operated in a client-server configuration to permit a user to retrieve web pages from a web-based server. One or more web browsers can be used to display and manipulate data on web pages.

Figure 2:
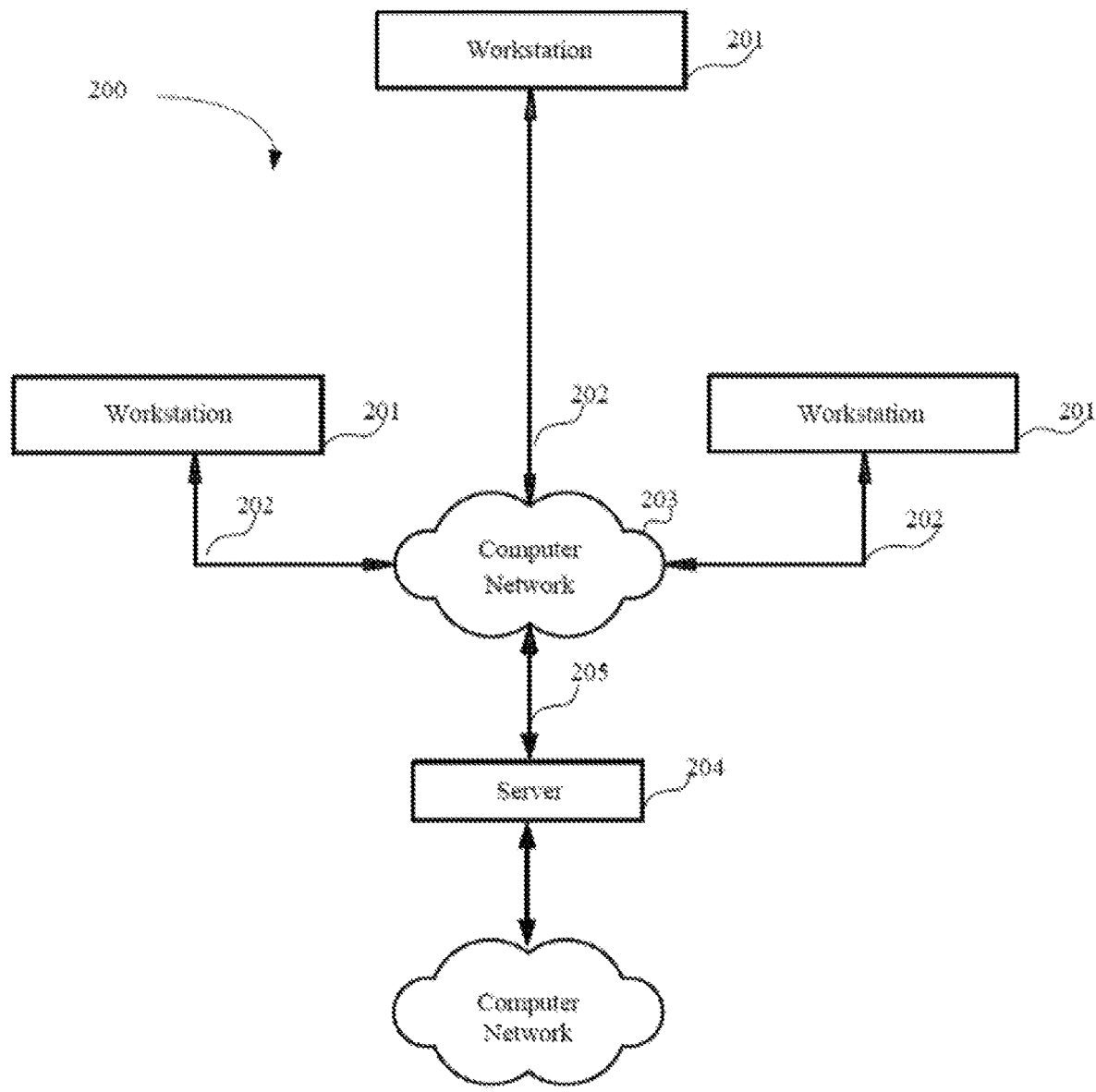
FIG. 2 depicts an illustrative block diagram of workstations and servers that may be used to implement the processes and functions of certain aspects of the present disclosure in accordance with one or more example embodiments.

FIG. 2 depicts an illustrative block diagram of workstations and servers that may be used to implement the processes and functions of certain aspects of the present disclosure in accordance with one or more example embodiments. Referring to FIG. 2, illustrative system 200 may be used for implementing example embodiments according to the present disclosure. As illustrated, system 200 may include one or more workstation computers 201. Workstation 201 may be, for example, a desktop computer, a smartphone, a wireless device, a tablet computer, a laptop computer, and the like. Workstations 201 may be local or remote, and may be connected by one of communications links 202 to computer network 203 that is linked via communications link 205 to server 204. In system 200, server 204 may be a server, processor, computer, or data processing device, or combination of the same. Server 204 may be used to process the instructions received from, and the transactions entered into by, one or more participants.

Computer network 203 may be a computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same.

Communications links 202 and 205 may be links configured to enable communications between workstations 201 and server 204, such as network links, dial-up links, wireless links, hard-wired links, and the like.

Figure 3:
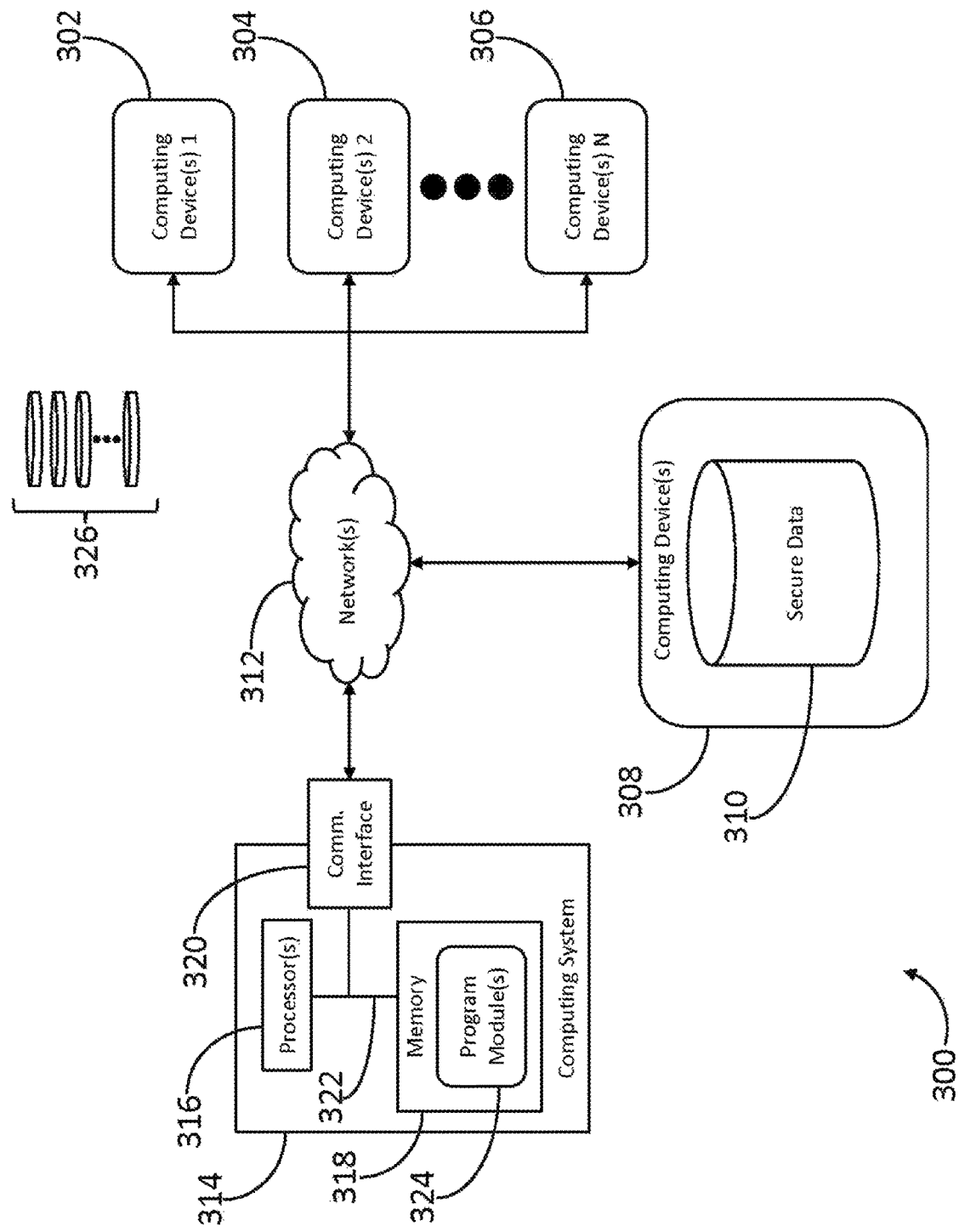
FIG. 3 depicts an illustrative computing environment for securing physical-storage-media data transfers in accordance with one or more example embodiments.

FIG. 3 depicts an illustrative computing environment for securing physical-storage-media data transfers in accordance with one or more example embodiments. Referring to FIG. 3, computing environment 300 may be associated with one or more organizations (e.g., corporations, universities, government entities, healthcare providers, financial institutions, or the like) and may include one or more computing devices. For example, computing environment 300 may include computing device(s) 302, 304, 306, and 308. Computing device(s) 302, 304, 306, and 308 may include one or more of any type of computing device (e.g., desktop computer, laptop computer, tablet computer, smart phone, server, server blade, mainframe, virtual machine, or the like) configured to perform one or more of the functions described herein. As will be described in greater detail below, one or more of computing device(s) 302, 304, 306, or 308 may store secure data associated with the organization. For example, computing device(s) 308 may store secure data 310. Computing environment 300 may also include one or more networks. For example, computing environment 300 may include network(s) 312, which may include one or more sub-networks (e.g., LANs, WANs, VPNs, or the like) and may interconnect one or more of computing device(s) 302, 304, 306, and 308.

Computing environment 300 may also include one or more computing systems. For example, computing environment 300 may include computing system 314. Computing system 314 may include one or more of any type of computing device (e.g., desktop computer, laptop computer, tablet computer, smart phone, server, server blade, mainframe, virtual machine, or the like) configured to perform one or more of the functions described herein. In some embodiments, computing system 314 may include one or more of computing device(s) 302, 304, 306, or 308. Computing system 314 may include one or more processor(s) 316, memory 318, communication interface 320, and/or data bus 322. Data bus 322 may interconnect processor(s) 316, memory 318, and/or communication interface 320. Communication interface 320 may be a network interface configured to support communications between computing system 314 and network(s) 312 (or one or more sub-networks thereof) (e.g., communications between computing system 314 and one or more of computing device(s) 302, 304, 306, or 308). Memory 318 may include one or more program modules comprising instructions that when executed by processor(s) 316 cause computing system 314 to perform one or more functions described herein. For example, memory 318 may include program module(s) 324, which may comprise instructions that when executed by processor(s) 316 cause computing system 314 to perform one or more functions described herein. As will be described in further detail below, computing environment 300 may further include one or more physical storage media 326. Physical storage media 326 may include one or more physically distinct media for storing computer data. Physical storage media 326 may include computer-data-storage media intended for repetitive or long-term use by a particular one of computing device(s) 302, 304, or 306 (e.g., fixed media, such as an integrated disk drive (e.g., a "hard" drive, one or more reusable disks or platters, solid-state-memory devices, or the like), or similar media), as well as computer-data-storage media intended for one-time or periodic short-term use by one or more of computing device(s) 302, 304, or 306 (e.g., removable media, such as diskettes (e.g., "floppy" diskettes, or the like), optical media (e.g., compact disk-recordable (CD-R) disks, compact disk-rewritable (CD-RW) disks, digital versatile (or video) disk (DVD) disks, or the like), solid-state-memory devices (e.g., solid-state-memory devices equipped with a universal serial bus (USB) interface, memory or flash cards, other volatile-memory devices, or the like), removable disk drives (e.g., external or peripheral disk drives, hot-swappable disk drives, or the like), or similar media).

Figure 4:
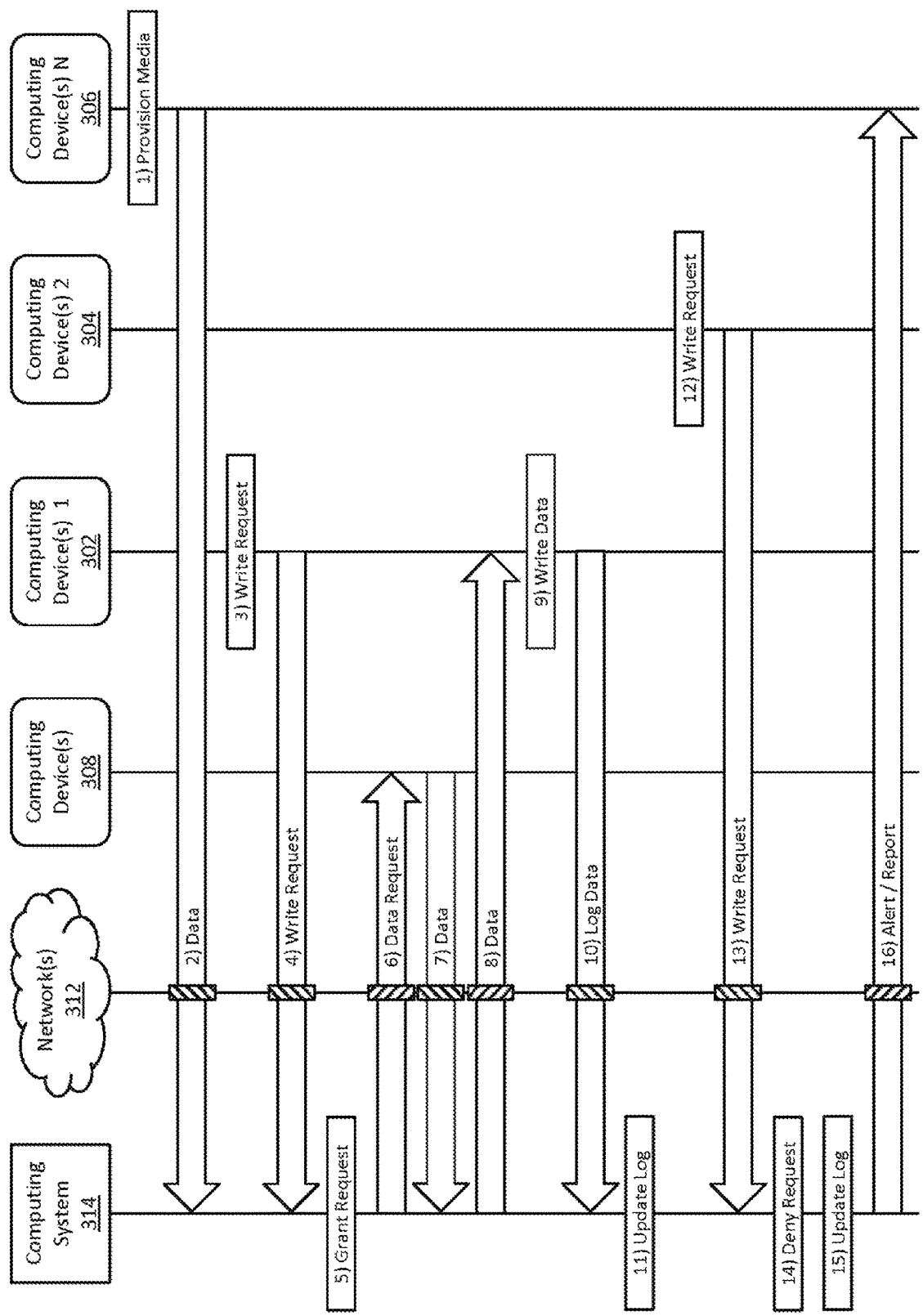
FIG. 4 depicts an illustrative event sequence for securing physical-storage-media data transfers in accordance with one or more example embodiments.

FIG. 4 depicts an illustrative event sequence for securing physical-storage-media data transfers in accordance with one or more example embodiments. Referring to FIG. 4, at step 1, computing device(s) 306 may provision physical storage media 326 with physical-storage-media identifiers. For example, computing device(s) 306 may be associated with a physical-storage-media administrator of the organization associated with computing environment 300, physical storage media 326 may comprise physical storage media approved for use by the organization, and the physical-storage-media administrator may utilize computing device(s) 306 to write a different (or unique) physical-storage-media identifier to each of physical storage media 326, each of which may store its respective physical-storage-media identifier.

In some embodiments, physical storage media 326 may include optical media, and computing device(s) 306 may write a different physical-storage-media identifier to each of the optical media. In some embodiments, each of the optical media may include a portion reserved for physical-storage-media identifiers associated with physical storage media 326 (e.g., physical storage media approved for use by the organization associated with computing environment 300), and computing device(s) 306 may write the different physical-storage-media identifier to the portion of the optical medium reserved for the physical-storage-media identifiers. In some embodiments, computing device(s) 306 may write the physical-storage-media identifier to the optical medium, during a first optical-media-writing session for the optical medium.

Additionally or alternatively, physical storage media 326 may include solid-state-memory devices, and computing device(s) 306 may write a different physical-storage-media identifier to each of the solid-state-memory devices. In some embodiments, each of the solid-state-memory devices may include a portion (e.g., a physically and/or logically separate memory, or the like) reserved for physical-storage-media identifiers associated with physical storage media 326. In such embodiments, computing device(s) 306 may write the different physical-storage-media identifier to the portion of the solid-state-memory device reserved for physical-storage-media identifiers.

In some embodiments, computing device(s) 306 may configure each physical storage medium of physical storage media 326 to prevent the portion of the physical storage medium reserved for physical-storage-media identifiers associated with physical storage media 326 from being displayed in a user-viewable portion of an operating system file system (e.g., to hide the reserved portion (or data contained therein) from view within the file system, prevent accidental access, modification, or manipulation of the reserved portion (or data contained therein), or the like).

At step 2, computing device(s) 306 may communicate (e.g., via network(s) 312, as indicated by the shaded box over the line extending downward from network(s) 312) the physical-storage-media identifiers associated with physical storage media 326 to computing system 314, which may receive (e.g., via communication interface 320) the physical-storage-media identifiers associated with physical storage media 326 and may generate, in a log stored in memory 318 an entry for each of physical storage media 326. Each entry may comprise the physical-storage-media identifier written by computing device(s) 306 to its corresponding physical storage medium. In some embodiments, computing device(s) 306 may communicate to computing system 314 one or more properties of each physical storage medium of physical storage media 326 (e.g., a number of times the physical storage medium has been written to, an available amount of storage on the physical storage medium, a total storage capacity of the physical storage medium, a manufacture of the physical storage medium, a number of times that the physical-storage-media identifier has been read from the physical storage medium, or the like), and each of the entries generated by computing system 314 may comprise the properties of its corresponding physical storage medium.

At step 3, computing device(s) 302 may generate a request to write a portion of secure data 310 to a physical storage medium. For example, secure data 310 may include data that the organization associated with computing environment 300 has identified as presenting a heightened data-leakage risk, and computing device(s) 302 and 304 may be among a limited number of computing device(s) within computing environment 300 authorized to write portions of secure data 310 to physical storage media 326; however, the authorization of computing device(s) 302 and 304 to write portions of secure data 310 to physical storage media 326 may be subject to case-by-case authorization from computing system 314. At step 4, computing device(s) 302 may communicate, to computing system 314, the request to write the portion of secure data 310 to the physical storage medium, and computing system 314 may receive (e.g., via communication interface 320) the request from computing device(s) 302. At step 5, computing system 314 may determine to grant the request received from computing device(s) 302. For example, the request to write the portion of secure data 310 to the physical storage medium may comprise a physical-storage-media identifier stored on the physical storage medium and read by computing device(s) 302 from the physical storage medium, and computing system 314 may identify, in the log stored in memory 318, an entry comprising the physical-storage-media identifier (e.g., amongst the entries generated by computing system 314, as described above with respect to step 2) and may determine to grant the request based on identifying the entry comprising the physical-storage-media identifier (e.g., based on determining that the physical-storage-media identifier is amongst the physical-storage-media identifiers associated with physical storage media 326 (e.g., physical storage media approved for use by the organization associated with computing environment 300)).

At step 6, computing system 314 may request the portion of secure data 310 from computing device(s) 308 (e.g., computing device(s) 302 and 304 may be unable to directly access secure data 310 due to their being among the limited number of computing device(s) within computing environment 300 authorized to write portions of secure data 310 to physical storage media 326), and, at step 7, computing device(s) 308 may communicate the requested portion of secure data 310 to computing system 314, which may receive (e.g., via communication interface 320) the requested portion of secure data 310 and, at step 8, may communicate, to computing device(s) 302 the requested portion of secure data 310, as well as instructions (and/or authorization) to write the requested portion of secure data 310 to the physical storage medium. At step 9, computing device(s) 302 may write the requested portion of secure data 310 to the physical storage medium. As indicated above, in some embodiments, the physical storage medium may comprise an optical medium, and computing device(s) 306 may have written the physical-storage-media identifier during a first optical-media-writing session for the optical medium. In such embodiments, computing device(s) 302 may write the requested portion of secure data 310 to the optical medium during a second optical-media-writing session for the optical medium.

At step 10, computing device(s) 302 may communicate log data (e.g., data indicating that the requested portion of secure data 310 was written to the physical storage medium and/or one or more updated properties of the physical storage medium (e.g., an updated number of times the physical storage medium has been written to, an updated amount of available storage on the physical storage medium, an updated number of times that the physical-storage-media identifier has been read from the physical storage medium, or the like)) to computing system 314, which may receive (e.g., via communication interface 320) the log data from computing device(s) 302 and, at step 11, may update the log entry comprising the physical-storage-media identifier (e.g., to reflect that computing system 314 instructed computing device(s) 302 to write the portion of secure data 310 to the physical storage medium, an updated number of times the physical storage medium has been written to, an updated amount of available storage on the physical storage medium, an updated number of times that the physical-storage-media identifier has been read from the physical storage medium, one or more associated timestamps or environment variables, or the like).

At step 12, computing device(s) 304 may generate a request to write a portion of secure data 310 to a physical storage medium. At step 13, computing device(s) 304 may communicate, to computing system 314, the request to write the portion of secure data 310 to the physical storage medium, and computing system 314 may receive (e.g., via communication interface 320) the request from computing device(s) 304. At step 14, computing system 314 may determine to deny the request received from computing device(s) 304 and may thus fail to instruct (and/or authorize) computing device(s) 304 to write the portion of secure data 310 to the physical storage medium. For example, in some embodiments, the request to write the portion of secure data 310 to the physical storage medium may comprise a physical-storage-media identifier stored on the physical storage medium and read by computing device(s) 304 from the physical storage medium, and computing system 314 may fail to identify, in the log stored in memory 318, an entry comprising the physical-storage-media identifier (e.g., amongst the entries generated by computing system 314, as described above with respect to step 2) and may determine to deny the request based on failing to identify an entry comprising the physical-storage-media identifier (e.g., based on determining that the physical-storage-media identifier is not amongst the physical-storage-media identifiers associated with physical storage media 326 (e.g., physical storage media approved for use by the organization associated with computing environment 300)).

Alternatively, computing system 314 may identify, in the log stored in memory 318, an entry comprising the physical-storage-media identifier (e.g., amongst the entries generated by computing system 314, as described above with respect to step 2) and may determine to deny the request based on identifying the entry comprising the physical-storage-media identifier (e.g., based on determining that the physical-storage-media identifier is amongst the physical-storage-media identifiers associated with physical storage media 326 (e.g., physical storage media approved for use by the organization associated with computing environment 300)). In some embodiments, computing system 314 may determine, based on the physical-storage-media identifier, that the physical storage medium has been tampered with. For example, the request received from computing device(s) 304 may comprise one or more properties of the physical storage medium determined by computing device(s) 304 (e.g., a number of times the physical storage medium has been written to, an available amount of storage on the physical storage medium, a total storage capacity of the physical storage medium, a manufacture of the physical storage medium, a number of times that the physical-storage-media identifier has been read from the physical storage medium, or the like).

As indicated above, in some embodiments, each of the entries generated by computing system 314 may comprise one or more properties of its corresponding physical storage medium (e.g., a number of times the physical storage medium has been written to, an available amount of storage on the physical storage medium, a total storage capacity of the physical storage medium, a manufacture of the physical storage medium, a number of times that the physical-storage-media identifier has been read from the physical storage medium, or the like). In such embodiments, computing system 314 may determine that the physical storage medium has been tampered with by determining that one or more of the properties of the physical storage medium included in the request received from computing device(s) 304 differs from one or more of the properties included in the entry comprising the physical-storage media identifier (e.g., that the request indicates that computing device(s) 304 determined a number of times the physical storage medium has been written to that differs from a number of times the physical storage medium has been written to indicated by the entry comprising the physical-storage-media identifier included in the request, that the request indicates that computing device(s) 304 determined an available amount of storage on the physical storage medium that differs from an available amount of storage of the physical storage medium indicated by the entry comprising the physical-storage-media identifier included in the request, that the request indicates that computing device(s) 304 determined a total storage capacity of the physical storage medium that differs from a total storage capacity of the physical storage medium indicated by the entry comprising the physical-storage-media identifier included in the request, that the request indicates that computing device(s) 304 determined a manufacture of the physical storage medium that differs from a manufacture of the physical storage medium indicated by the entry comprising the physical-storage-media identifier included in the request, that the request indicates that computing device(s) 304 determined a number of times that the physical-storage-media identifier has been read from the physical storage medium that differs from a number of times that the physical-storage-media identifier has been read from the physical storage medium indicated by the entry comprising the physical-storage-media identifier included in the request, or the like).

At step 15, computing system 314 may update the log entry comprising the physical-storage-media identifier (e.g., to reflect that computing system 314 failed to instruct computing device(s) 304 to write the portion of secure data 310 to the physical storage medium. At step 16, computing system 314 may generate (e.g., based on one or more of the log entries updated in steps 11 and 15) a message indicating whether computing system 314 instructed computing device(s) 302 and/or 304 to write the requested portions of secure data 310 to the physical storage media and may communicate the message to computing device(s) 306. For example, in some embodiments, the message may comprise a report indicating that computing system 314 instructed computing device(s) 302 to write the requested portion of secure data 310 to the physical storage medium and failed to instruct computing device(s) 304 to write the requested portion of secure data 310 to the physical storage medium. Additionally or alternatively, the message may comprise an alert generated by computing system 314 in response to the request received from computing device(s) 304 and may indicate that computing system 314 failed to instruct computing device(s) 304 to write the requested portion of secure data 310 to the physical storage medium.

Figure 5:
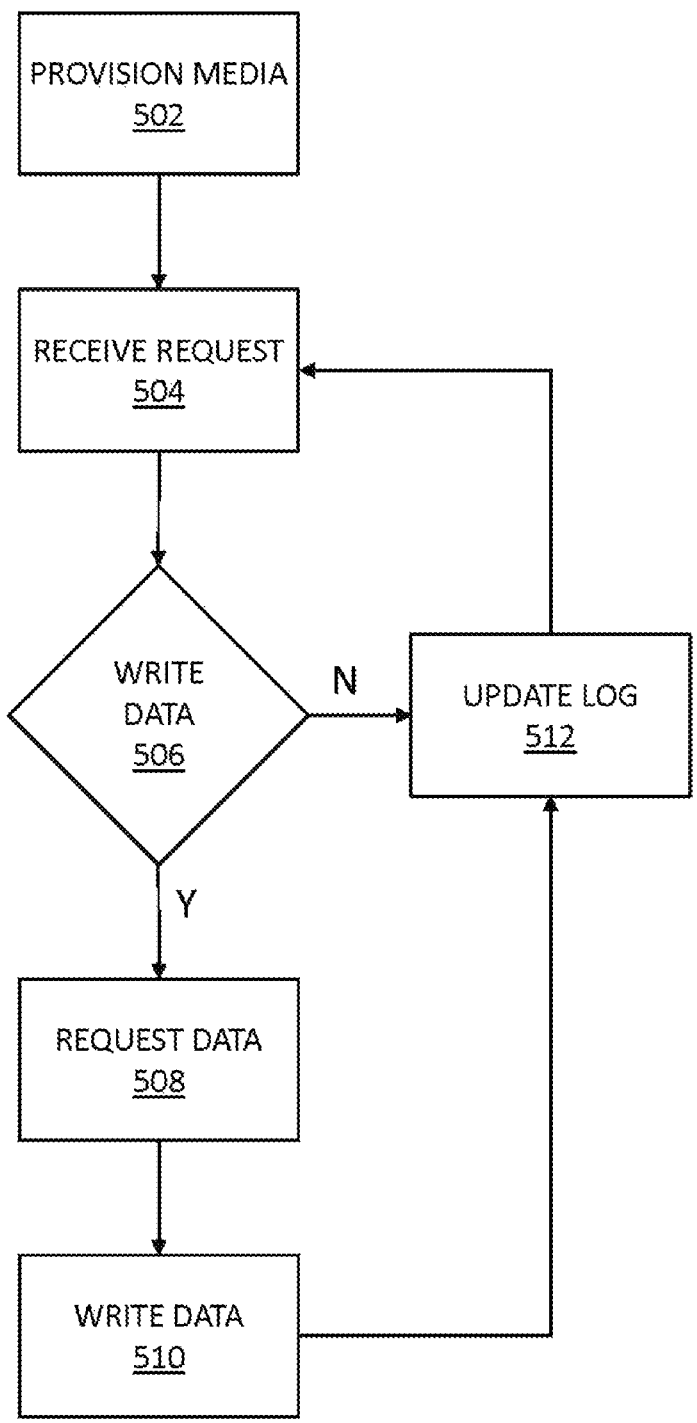
FIG. 5 depicts an illustrative method for securing physical-storage-media data transfers in accordance with one or more example embodiments.

FIG. 5 depicts an illustrative method for securing physical-storage-media data transfers in accordance with one or more example embodiments. Referring to FIG. 5, at step 502, physical storage media approved for use by an organization may be provisioned with physical-storage-media identifiers. For example, computing device(s) 306 may write a different physical-storage-media identifier to each of physical storage media 326. At step 504, a request to write secure data to a physical storage medium may be received. For example, computing system 314 may receive a request to write a portion of secure data 310 to a physical storage medium from computing device(s) 302 or 304. At step 506, a determination may be made whether to write the secure data to the physical storage medium. For example, computing system 314 may determine that computing device(s) 302 should write the requested portion of secure data 310 to the physical storage medium and/or that computing device(s) 304 should not write the requested portion of secure data 310 to the physical storage medium. Responsive to determining that the secure data should be written to the physical storage medium, at step 508, the secure data may be requested, and, at step 510, the secure data may be written to the physical storage medium. For example, responsive to determining that computing device(s) 302 should write the requested portion of secure data 310 to the physical storage medium, computing system 314 may request the portion of secure data 310 from computing device(s) 308 and communicate the portion of secure data 310 to computing device(s) 302, which may write the portion of secure data 310 to the physical storage medium. Similarly, responsive to determining that computing device(s) 304 should not write the requested portion of secure data 310 to the physical storage medium, computing system 314 may fail to request the portion of secure data 310 from computing device(s) 308. At step 512, a log may be updated to reflect whether the requested portion of the secure data was written to the physical storage medium. For example, computing system 314 may update the log to reflect that computing device(s) 302 wrote the requested portion of secure data 310 to the physical storage medium and/or that computing device(s) 304 failed to write the requested portion of secure data 310 to the physical storage medium.

Figure 6A:
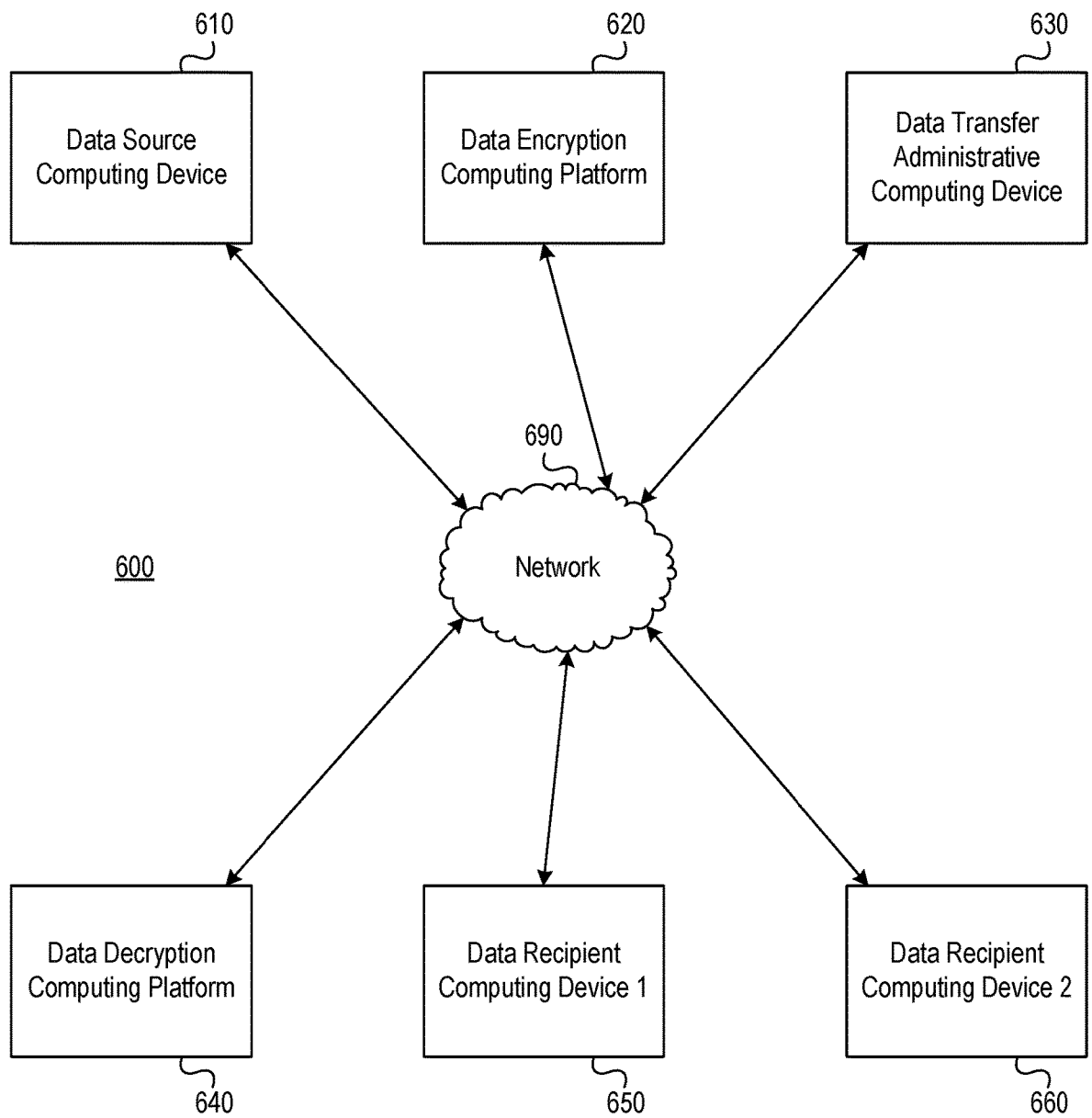
FIGS. 6A and 6B depict an illustrative computing environment for ensuring information security in data transfers by utilizing decoy data in accordance with one or more example embodiments.
Figure 6B:
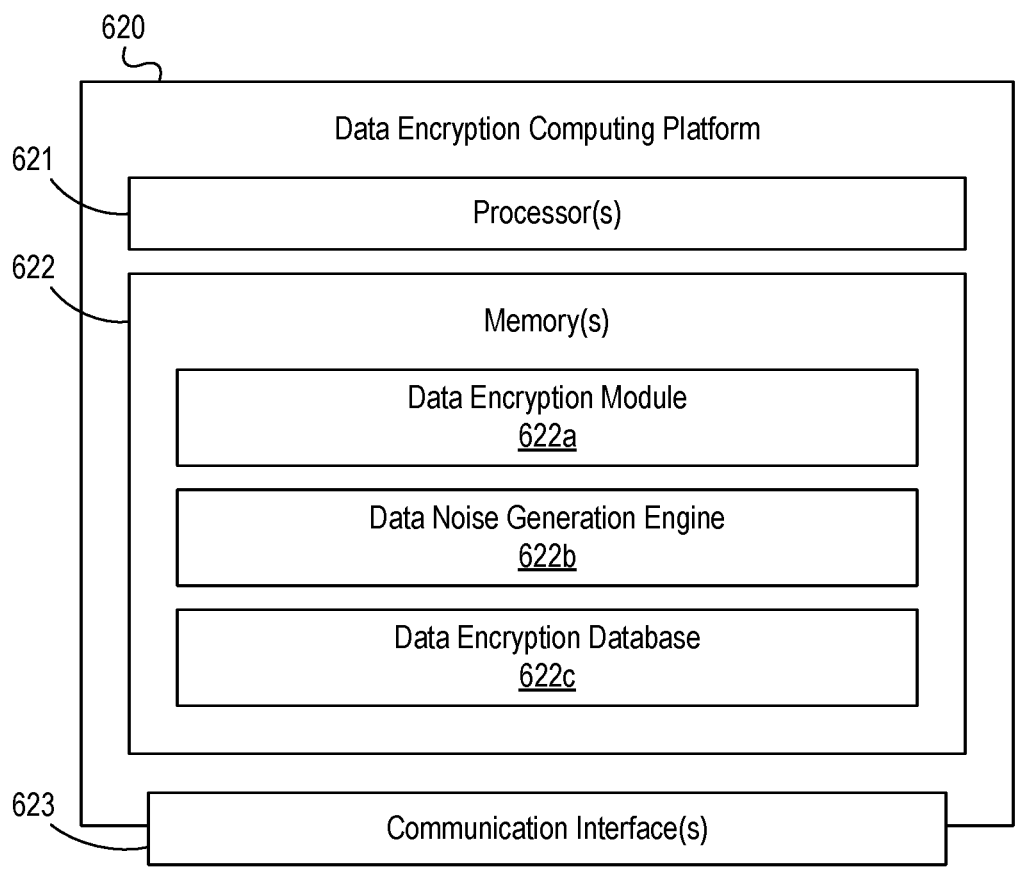

FIGS. 6A and 6B depict an illustrative computing environment for ensuring information security in data transfers by utilizing decoy data in accordance with one or more example embodiments. Referring to FIG. 6A, computing environment 600 may include one or more computer systems and/or computing devices. For example, computing environment 600 may include a data source computing device 610, a data encryption computing platform 620, a data transfer administrative computing device 630, a data decryption computing platform 640, a first data recipient computing device 650, and a second data recipient computing device 660.

Data source computing device 610 may be a computing device (e.g., a desktop computing device, a laptop computing device, and/or the like) that is used by a first user of an organization (e.g., a financial institution). As illustrated below, data source computing device 610 may store a source data collection, and the user of data source computing device 610 may initiate a secure data transfer of the source data collection to one or more recipient computer systems and/or devices via physical media, via electronic transmission, and/or via another mode of transfer.

As illustrated below, data encryption computing platform 620 may include one or more computing devices configured to perform one or more of the functions described herein. For example, data encryption computing platform 620 may include one or more computers (e.g., laptop computers, desktop computers, servers, server blades, or the like) configured to perform one or more of the functions described herein, as discussed in greater detail below.

Data transfer administrative computing device 630 may be a computing device (e.g., a desktop computing device, a laptop computing device, and/or the like) that is used by a second user of an organization (e.g., a financial institution), such as an administrative user who is tasked with and/or responsible for facilitating and/or monitoring secure data transfers. As illustrated below, data transfer administrative computing device 630 may receive and present notifications and/or other user interfaces associated with secure data transfers, and in some instances, data transfer administrative computing device 630 may send commands to other systems and/or devices included in computing environment 600

(e.g., based on input received from a user of data transfer administrative computing device 630) to facilitate and/or control one or more parameters of various secure data transfers.

Data decryption computing platform 640 may include one or more computing devices configured to perform one or more data decryption functions, data reassembly functions, and/or other functions described herein. For example, data decryption computing platform 640 may include one or more computers (e.g., laptop computers, desktop computers, servers, server blades, or the like) configured to execute and/or otherwise provide a data decryption engine and/or other functions, such as decrypting one or more datasets and/or reassembling one or more data collections associated with the one or more datasets (e.g., by removing decoy data), as discussed in greater detail below.

Data recipient computing device 650 may be a computing device (e.g., a desktop computing device, a laptop computing device, and/or the like) that is used by a third user of an organization (e.g., a financial institution). As illustrated below, data recipient computing device 650 may receive a data collection via a secure data transfer initiated by and/or facilitated by one or more other systems and/or devices included in computing environment 600. Similarly, data recipient computing device 660 may be a computing device (e.g., a desktop computing device, a laptop computing device, and/or the like) that is used by a fourth user of an organization (e.g., a financial institution). In addition, and as illustrated below, data recipient computing device 660 may receive a data collection via a secure data transfer initiated by and/or facilitated by one or more other systems and/or devices included in computing environment 600.

In some arrangements, data source computing device 610, data encryption computing platform 620, data transfer administrative computing device 630, data decryption computing platform 640, data recipient computing device 650, and data recipient computing device 660 may be any type of computing device capable of receiving a user interface, receiving input via the user interface, and communicating the received input to one or more other computing devices. For example, data source computing device 610, data encryption computing platform 620, data transfer administrative computing device 630, data decryption computing platform 640, data recipient computing device 650, and data recipient computing device 660 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of data source computing device 610, data encryption computing platform 620, data transfer administrative computing device 630, data decryption computing platform 640, data recipient computing device 650, and data recipient computing device 660 may, in some instances, be special-purpose computing devices configured to perform specific functions.

Computing environment 600 also may include one or more networks, which may interconnect one or more of data source computing device 610, data encryption computing platform 620, data transfer administrative computing device 630, data decryption computing platform 640, data recipient computing device 650, and data recipient computing device 660. For example, computing environment 600 may include network 690, which may include one or more public networks, private networks, and/or sub-networks (e.g., local area networks (LANs), wide area networks (WANs), or the like) that may interconnect one or more of data source computing device 610, data encryption computing platform 620, data transfer administrative computing device 630, data decryption computing platform 640, data recipient computing device 650, and data recipient computing device 660.

Referring to FIG. 6B, data encryption computing platform 620 may include one or more processors 621, one or more memories 622, and one or more communication interfaces 623. A data bus may interconnect the one or more processors 621, the one or more memories 622, and the one or more communication interfaces 623. Communication interface 623 may be a network interface configured to support communication between data encryption computing platform 620 and one or more networks (e.g., network 690 or the like). Memory 622 may include one or more program modules having instructions that when executed by processor 621 cause data encryption computing platform 620 to perform one or more functions described herein and/or one or more databases and/or other libraries that may store and/or otherwise maintain information which may be used by such program modules and/or processor 621.

In some instances, the one or more program modules and/or databases may be stored by and/or maintained in different memory units of data encryption computing platform 620 and/or by different computing devices that may form and/or otherwise make up data encryption computing platform 620. For example, memory 622 may have, store, and/or include a data encryption module 622a, a data noise generation engine 622b, and a data encryption database 622c. Data encryption module 622a may include executable instructions that enable and/or cause data encryption computing platform 620 to encrypt one or more data collections and/or one or more datasets, initiate one or more secure transfers of one or more encrypted datasets, and/or perform other functions, as illustrated in greater detail below. Data noise generation engine 622b may include executable instructions that enable and/or cause data encryption computing platform 620 to generate decoy data, produce one or more secure datasets by combining one or more data collections with generated decoy data, and/or perform other functions, as illustrated in greater detail below. Data encryption database 622c may store and/or otherwise maintain information that may be used by data encryption computing platform 620 in encrypting one or more data collections and/or one or more datasets, in initiating one or more secure transfers of one or more encrypted datasets, in generating decoy data, in producing one or more secure datasets, and/or in performing other functions, as illustrated in greater detail below.

Figure 7B:
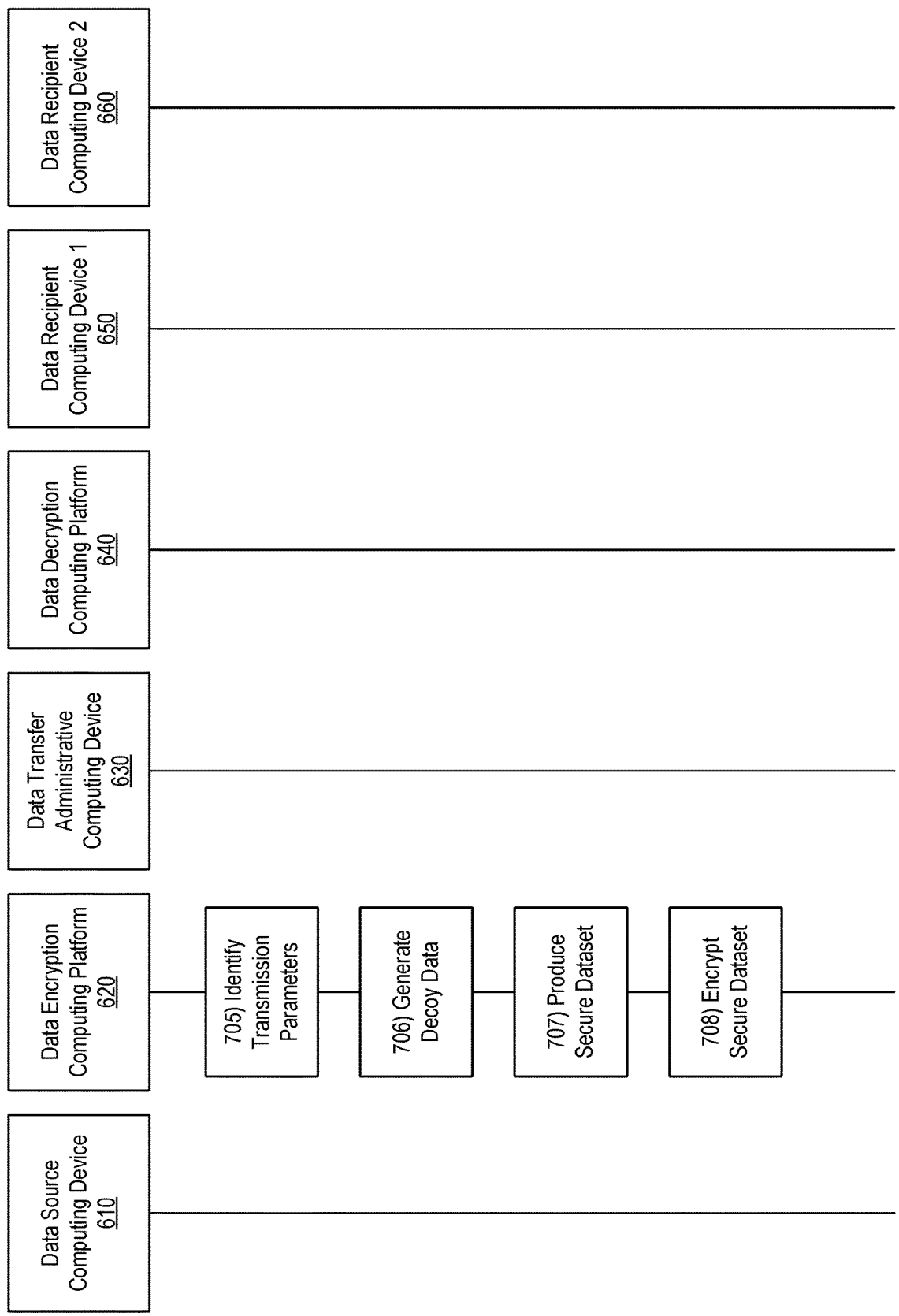

FIGS. 7A, 7B, 7C, 7D, and 7E depict an illustrative event sequence for ensuring information security in data transfers by utilizing decoy data in accordance with one or more example embodiments. Referring to FIG. 7A, at step 701, data source computing device 610 may receive input requesting a secure data transfer. In some instances, the input requesting the secure data transfer may be received by data source computing device 610 via one or more graphical user interfaces displayed and/or otherwise presented by data source computing device 610. For example, at step 701, data source computing device 610 may present one or more graphical user interfaces, such as one or more graphical user interfaces similar to graphical user interface 800, which is depicted in FIG. 8. As seen in FIG. 8, graphical user interface 800 may include one or more controls and/or other elements that enable a user of data source computing device 610 to request a secure data transfer and/or specify one or more parameters of the secure data transfer, such as the data collection to be transferred, one or more specific recipients to receive the data collection to be transferred, a specific type of physical media to be used in completing the secure data transfer, a specific quantity of physical media to be used in completing the secure data transfer, a specific encryption method to be used in completing the secure data transfer, a particular data decoy option to be used (e.g., by data encryption computing platform 620 in generating decoy data, as discussed below) in completing the secure data transfer, and/or other parameters. Any and/or all of these parameters may be sent to data encryption computing platform 620 by data source computing device 610 to initiate and/or facilitate the secure data transfer of the data collection, as illustrated below.

At step 702, data source computing device 610 may identify a source data collection to be transferred (e.g., based on the input requesting the secure data transfer). For instance, data source computing device 610 may access and/or store a plurality of data collections and, at step 702, may identify a source data collection to be transferred by selecting the source data collection from the plurality of data collections accessible to and/or stored by data source computing device 610. At step 703, data source computing device 610 may send the source data collection to data encryption computing platform 620.

At step 704, data encryption computing platform 620 may receive the source data collection to be transferred from data source computing device 610. For example, at step 704, data encryption computing platform 620 may receive, via the communication interface (e.g., communication interface 623), from a data source computing device (e.g., data source computing device 610), a source data collection for a secure physical-storage-media data transfer. In some instances, in receiving the source data collection for the secure physical-storage-media data transfer from data source computing device 610, data encryption computing platform 620 may establish a connection with data source computing device 610 via communication interface 623, and data encryption computing platform 620 may receive the source data collection for the secure physical-storage-media data transfer from data source computing device 610 while the connection with data source computing device 610 is established.

Referring to FIG. 7B, at step 705, data encryption computing platform 620 may identify one or more transmission parameters for the secure data transfer. For example, at step 705, based on receiving the source data collection for the secure physical-storage-media data transfer from the data source computing device (e.g., data source computing device 610), data encryption computing platform 620 may identify one or more transmission parameters associated with the secure physical-storage-media data transfer. In some instances, data encryption computing platform 620 may identify one or more transmission parameters for the secure data transfer based on specifications and/or other information received from data source computing device 610, and these specifications and/or other information received from data source computing device 610 may include the one or more parameters specified by the user of data source computing device 610 via the one or more graphical user interfaces discussed above. Additionally or alternatively, data encryption computing platform 620 may identify one or more transmission parameters for the secure data transfer based on information maintained by data encryption computing platform 620 identifying the capabilities and/or supported encryption standards and/or data types of one or more recipient systems and/or devices (e.g., data decryption computing platform 640, data recipient computing device 650, data recipient computing device 660). For instance, data encryption computing platform 620 may select specific encryption standards and/or data types to use in the secure data transfer based on the capabilities and/or supported encryption standards and/or data types of one or more recipient systems and/or devices (e.g., data decryption computing platform 640, data recipient computing device 650, data recipient computing device 660).

In some embodiments, the one or more transmission parameters associated with the secure physical-storage-media data transfer may specify a quantity of physical media to be used in the secure physical-storage-media data transfer. For example, the one or more transmission parameters associated with the secure physical-storage-media data transfer (which may, e.g., be identified by data encryption computing platform 620) may specify a quantity of physical media to be used by data encryption computing platform 620 in the secure physical-storage-media data transfer.

In some embodiments, the one or more transmission parameters associated with the secure physical-storage-media data transfer may specify an encryption method to be used in the secure physical-storage-media data transfer. For example, the one or more transmission parameters associated with the secure physical-storage-media data transfer (which may, e.g., be identified by data encryption computing platform 620) may specify an encryption method to be used by data encryption computing platform 620 in the secure physical-storage-media data transfer.

At step 706, data encryption computing platform 620 may generate decoy data (e.g., using data noise generation engine 622*b*) to be used in the secure physical-storage-media data transfer. For example, at step 706, data encryption computing platform 620 may generate decoy data for the secure physical-storage-media data transfer based on the one or more transmission parameters associated with the secure physical-storage-media data transfer. In some instances, the decoy data generated by data encryption computing platform 620 and/or data noise generation engine 622*b* for the secure physical-storage-media data transfer may be randomly generated bits and/or other random data, a predetermined sequence of alphanumeric characters and/or other data (e.g., ABCD, ABCD, and so on), all zeros or all ones, or some other set of nonsense data that may be generated using one or more random character generators and/or other algorithms that may be executed by data encryption computing platform 620 and/or data noise generation engine 622*b*. In some instances, the one or more transmission parameters associated with the secure physical-storage-media data transfer (which may, e.g., be identified by data encryption computing platform 620) may specify a specific type of decoy data to be generated and/or used by data encryption computing platform 620 in the secure physical-storage-media data transfer, one or more specific points in a dataset where the decoy data should be inserted and/or combined with actual data to facilitate the secure physical-storage-media data transfer, a specific way in which the decoy data should be identified (e.g., with one or more tags, with a catalog, and/or the like), and/or other characteristics of the decoy data.

At step 707, data encryption computing platform 620 may produce a secure dataset for the secure physical-storage-media data transfer (e.g., based on the source data collection, the generated decoy data, and/or the one or more transmission parameters associated with the secure physical-storage-media data transfer). For example, at step 707, data encryption computing platform 620 may produce a secure dataset for the secure physical-storage-media data transfer by combining the decoy data generated for the secure physical-storage-media data transfer and the source data collection received from the data source computing device (e.g., data source computing device 610).

In some embodiments, producing the secure dataset for the secure physical-storage-media data transfer may include adding one or more header tags to the decoy data generated for the secure physical-storage-media data transfer, and the one or more header tags may identify the decoy data generated for the secure physical-storage-media data transfer as noise data to be discarded by a data decryption computing platform when decrypting the encrypted dataset stored on the one or more physical media. For example, in producing the secure dataset for the secure physical-storage-media data transfer, data encryption computing platform 620 may add one or more header tags to the decoy data generated for the secure physical-storage-media data transfer (e.g., by inserting the one or more header tags into the decoy data, to set off the transition points between actual data from the source data collection and the decoy data). In addition, the one or more header tags (which may, e.g., be generated and/or added by data encryption computing platform 620) may identify the decoy data generated for the secure physical-storage-media data transfer as noise data to be discarded by a data decryption computing platform (e.g., data decryption computing platform 640) when decrypting the encrypted dataset stored on the one or more physical media, as discussed below.

In some embodiments, producing the secure dataset for the secure physical-storage-media data transfer may include adding a catalog to the secure dataset, and the catalog may identify the decoy data generated for the secure physical-storage-media data transfer as noise data to be discarded by a data decryption computing platform when decrypting the encrypted dataset stored on the one or more physical media. For example, in producing the secure dataset for the secure physical-storage-media data transfer, data encryption computing platform 620 may add a catalog to the secure dataset (e.g., by inserting the catalog at the beginning, at the end, or at another particular place in the combined dataset resulting from the combination of the data source collection and the decoy data). In addition, the catalog (which may, e.g., be generated and/or added by data encryption computing platform 620) may identify the decoy data generated for the secure physical-storage-media data transfer as noise data to be discarded by a data decryption computing platform (e.g., data decryption computing platform 640) when decrypting the encrypted dataset stored on the one or more physical media, as discussed below.

In some embodiments, producing the secure dataset for the secure physical-storage-media data transfer may include inserting the decoy data generated for the secure physical-storage-media data transfer at one or more predetermined locations in the secure dataset based on specifications associated with a predetermined recipient of the one or more physical media. For example, in producing the secure dataset for the secure physical-storage-media data transfer, data encryption computing platform 620 may insert the decoy data generated for the secure physical-storage-media data transfer at one or more predetermined locations in the secure dataset based on specifications associated with a predetermined recipient of the one or more physical media. In such arrangements, data encryption computing platform 620 may, for instance, insert decoy data in places agreed to in advance (e.g., between the sending and receiving systems and/or entities) to enable a receiving system (e.g., data decryption computing platform 640) to identify and/or remove the decoy data (e.g., even if such decoy data is not separately identified as noise data to be discarded by one or more header tags and/or a catalog) so as to reproduce the source data collection from the encrypted dataset stored on the one or more physical media, as discussed below.

At step 708, data encryption computing platform 620 may encrypt the secure dataset (which may, e.g., have been produced by data encryption computing platform 620 by combining the source data collection and the decoy data, as discussed above). For example, at step 708, data encryption computing platform 620 may encrypt the secure dataset based on the one or more transmission parameters associated with the secure physical-storage-media data transfer to produce an encrypted dataset for the secure physical-storage-media data transfer. In some instances, in encrypting the secure dataset based on the one or more transmission parameters associated with the secure physical-storage-media data transfer to produce the encrypted dataset for the secure physical-storage-media data transfer, data encryption computing platform 620 may encrypt the secure dataset using one or more encryption methods specified by the one or more transmission parameters and/or may divide the encrypted data into a plurality of discrete data blocks (e.g., as may be specified by the one or more transmission parameters).

Figure 7C:
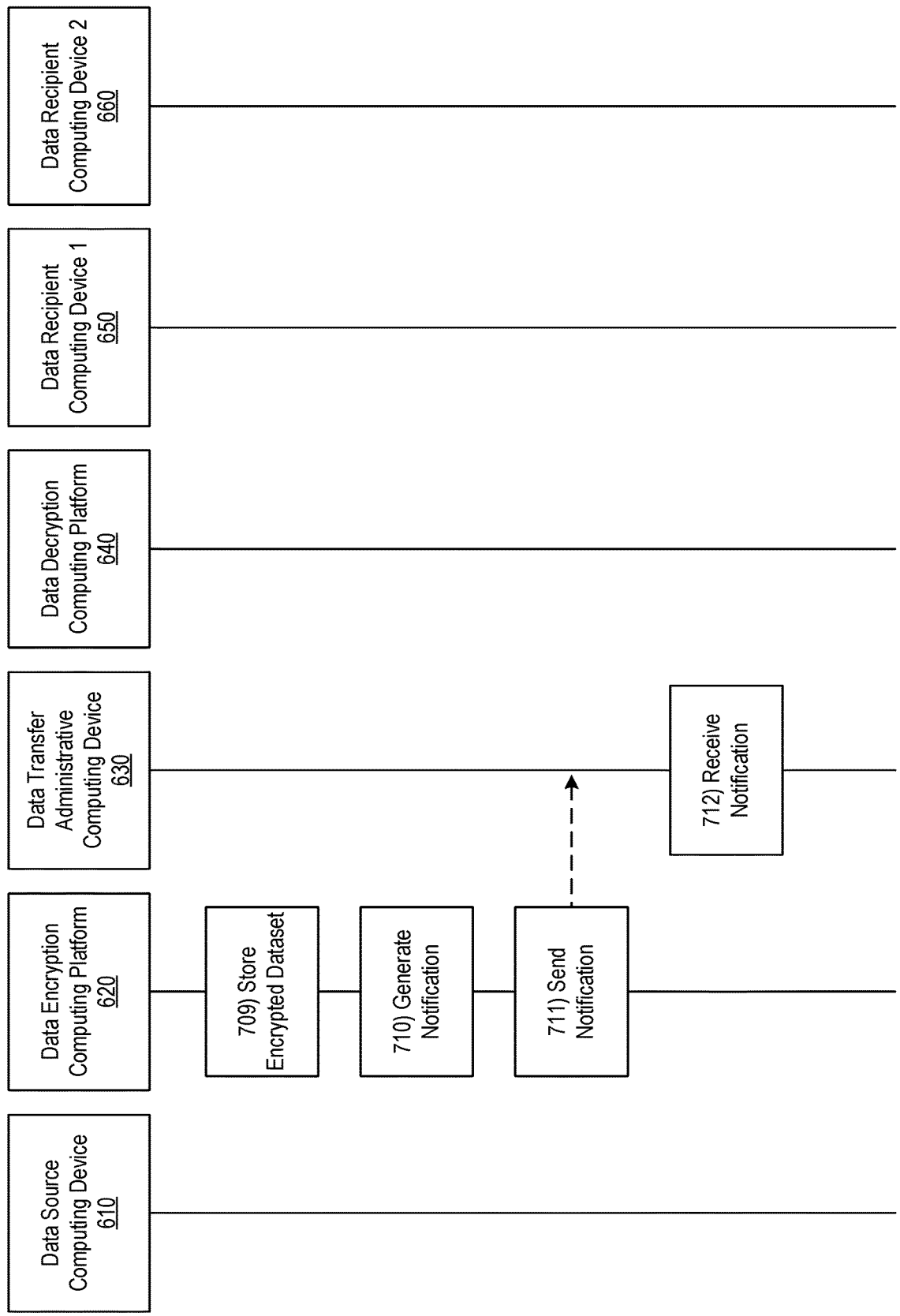
Figure 8:
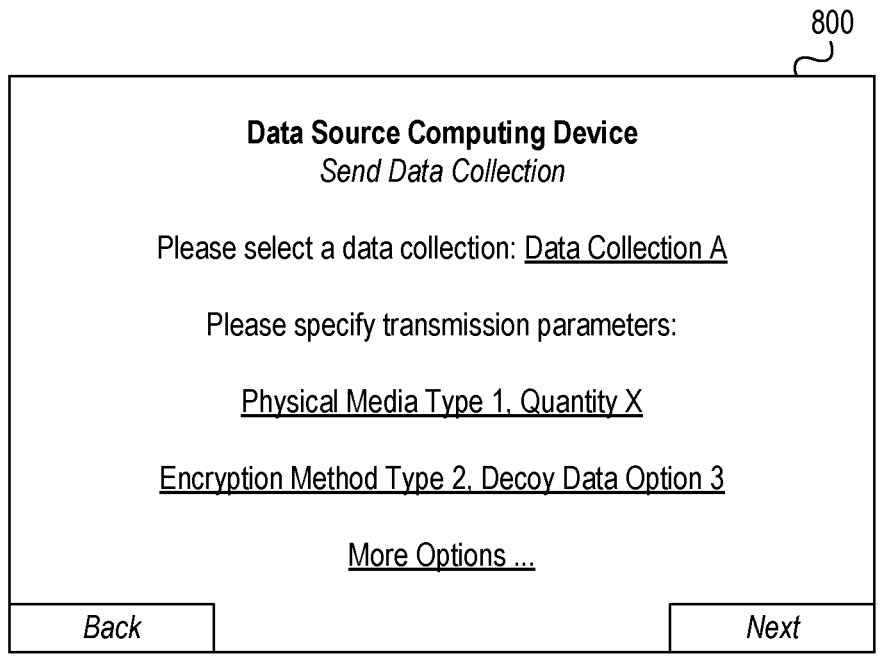
FIGS. 8 and 9 depict illustrative graphical user interfaces associated with ensuring information security in data transfers by utilizing decoy data in accordance with one or more example embodiments.

Referring to FIG. 7C, at step 709, data encryption computing platform 620 may store the encrypted dataset on one or more physical media. For example, at step 709, after encrypting the secure dataset based on the one or more transmission parameters associated with the secure physical-storage-media data transfer to produce the encrypted dataset for the secure physical-storage-media data transfer, data encryption computing platform 620 may store the encrypted dataset on one or more physical media. As illustrated below, the one or more physical media subsequently may be physically transferred to a destination system, such as data decryption computing platform 640, which may decrypt the encrypted dataset and reproduce the source data collection to facilitate the secure physical-storage-media data transfer.

In some embodiments, storing the encrypted dataset on the one or more physical media may include storing the encrypted dataset on one or more compact discs. For example, in storing the encrypted dataset on the one or more physical media, data encryption computing platform 620 may store the encrypted dataset on one or more compact discs.

In some embodiments, storing the encrypted dataset on the one or more physical media may include storing the encrypted dataset on one or more flash drives. For example, in storing the encrypted dataset on the one or more physical media, data encryption computing platform 620 may store the encrypted dataset on one or more flash drives.

In some embodiments, storing the encrypted dataset on the one or more physical media may include storing the encrypted dataset on one or more hard drives. For example, in storing the encrypted dataset on the one or more physical media, data encryption computing platform 620 may store the encrypted dataset on one or more hard drives.

In some embodiments, storing the encrypted dataset on the one or more physical media may include storing the encrypted dataset on one or more magnetic tapes. For example, in storing the encrypted dataset on the one or more physical media, data encryption computing platform 620 may store the encrypted dataset on one or more magnetic tapes.

In some embodiments, storing the encrypted dataset on the one or more physical media may include storing different portions of the encrypted dataset on two or more separately shippable physical media, and the different portions of the encrypted dataset stored on the two or more separately shippable physical media may be configured to be decrypted and reassembled into the source data collection by a data decryption computing platform. For example, in storing the encrypted dataset on the one or more physical media, data encryption computing platform 620 may store different portions of the encrypted dataset on two or more separately shippable physical media, and the different portions of the encrypted dataset stored on the two or more separately shippable physical media may be configured to be decrypted and reassembled into the source data collection by a data decryption computing platform (e.g., data decryption computing platform 640), as illustrated below. The two or more separately shippable physical media may, for instance, be different physical media that may be separately transferable to a recipient, such as different discs, tapes, drives, and/or the like, which may be packaged in separate shipping containers, such as different envelopes, boxes, crates, or the like. In this way, each portion of the encrypted dataset may be separately shipped on its own dedicated physical medium to a recipient system (e.g., data decryption computing platform 640) that may decrypt and reassemble the source data collection from all of the separate physical media and the corresponding portions of the encrypted dataset, so as to further enhance the security of the information transferred in the secure physical-storage-media data transfer.

At step 710, data encryption computing platform 620 may generate a notification indicating that the physical media are ready for transfer. For example, at step 710, based on storing the encrypted dataset on the one or more physical media, data encryption computing platform 620 may generate a notification indicating that the one or more physical media are ready to be transferred to a destination system (e.g., data decryption computing platform 640). At step 711, data encryption computing platform 620 may send the notification to data transfer administrative computing device 630. For example, at step 711, data encryption computing platform 620 may send, via the communication interface (e.g., communication interface 623), to a data transfer administrative computing device (e.g., data transfer administrative computing device 630), the notification indicating that the one or more physical media are ready to be transferred to the destination system (e.g., data decryption computing platform 640) to initiate a physical transfer of the one or more physical media.

At step 712, data transfer administrative computing device 630 may receive the notification from data encryption computing platform 620. In addition, in response to receiving the notification from data encryption computing platform 620, data transfer administrative computing device 630 may automatically initiate the physical shipping and/or sending of the physical media to the destination system (e.g., data decryption computing platform 640). Additionally or alternatively, in response to receiving the notification from data encryption computing platform 620, data transfer administrative computing device 630 may present one or more graphical user interfaces (which may, e.g., include the notification and/or information generated by data transfer administrative computing device 630 based on the notification) to a user of data transfer administrative computing device 630 who may facilitate the physical shipping and/or sending of the physical media to the destination system (e.g., data decryption computing platform 640).

Referring to FIG. 7D, at step 713, data decryption computing platform 640 may receive physical media. For example, at step 713, data decryption computing platform 640 may receive the one or more physical media on which the encrypted dataset was stored by data encryption computing platform 620. Data decryption computing platform 640 may, for instance, receive the physical media as a result of and/or after completion of the physical shipping process initiated and/or facilitated by data encryption computing platform 620 and/or data transfer administrative computing device 630. Additionally or alternatively, in receiving the physical media, data decryption computing platform 640 may receive and/or load the physical media via one or more slots, readers, and/or input devices (e.g., disc readers, tape readers, drive ports, and/or the like).

At step 714, data decryption computing platform 640 may load the encrypted dataset from the one or more physical media. At step 715, data decryption computing platform 640 may decrypt the encrypted dataset loaded from the one or more physical media. For example, at step 715, data decryption computing platform 640 may execute one or more decryption methods, corresponding to the one or more encryption methods used by data encryption computing platform 620 to encrypt the secure dataset, so as to decrypt the encrypted dataset loaded from the one or more physical media.

At step 716, data decryption computing platform 640 may reassemble the source data collection from the decrypted dataset. For example, at step 716, data decryption computing platform 640 may reassemble the source data collection from the decrypted dataset by removing the decoy data (which may, e.g., have been added to and/or combined with the actual data of the source data collection by data encryption computing platform 620, as discussed above) from the decrypted dataset, so as to reproduce the source data collection. In some instances, data decryption computing platform 640 may remove the decoy data from the decrypted dataset by identifying specific data in the decrypted dataset as noise data to be discarded (e.g., based on tags identifying particular data as noise data, based on a catalog identifying particular data as noise data, and/or based on particular data being located in particular noise-data positions within the decrypted dataset, as discussed above). Subsequently, data decryption computing platform 640 may delete, from the decrypted dataset, the specific data identified as noise data to be discarded.

Figure 7E:
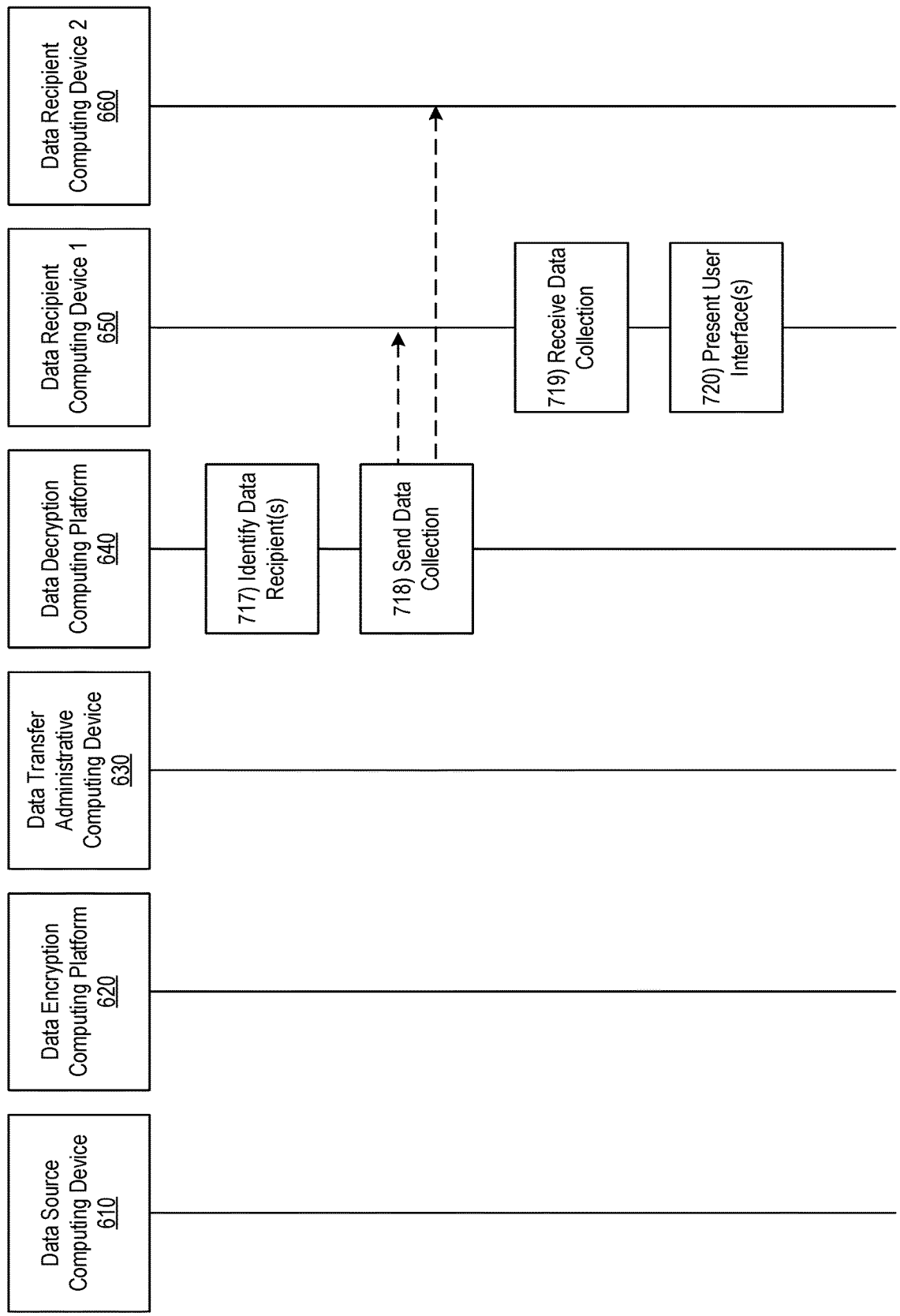

Referring to FIG. 7E, at step 717, data decryption computing platform 640 may identify one or more data recipients. For example, at step 717, data decryption computing platform 640 may identify one or more data recipients with which data decryption computing platform 640 may share the data collection itself and/or access to the data collection (which may, e.g., be stored on and/or hosted by data decryption computing platform 640). In some instances, data decryption computing platform 640 may identify the one or more data recipients based on tags and/or other metadata that may have been added to the secure dataset by data encryption computing platform 620 and/or otherwise included with the secure dataset (e.g., based on specifications and/or other information provided by a source device, such as data source computing device 610). At step 718, data decryption computing platform 640 may send the data collection to data recipient computing device 650 and/or data recipient computing device 660. Additionally or alternatively, data decryption computing platform 640 may host the data collection, may send one or more invites to access the data collection to data recipient computing device 650 and/or data recipient computing device 660, and/or may provide access to the data collection to data recipient computing device 650 and/or data recipient computing device 660.

Figure 9:
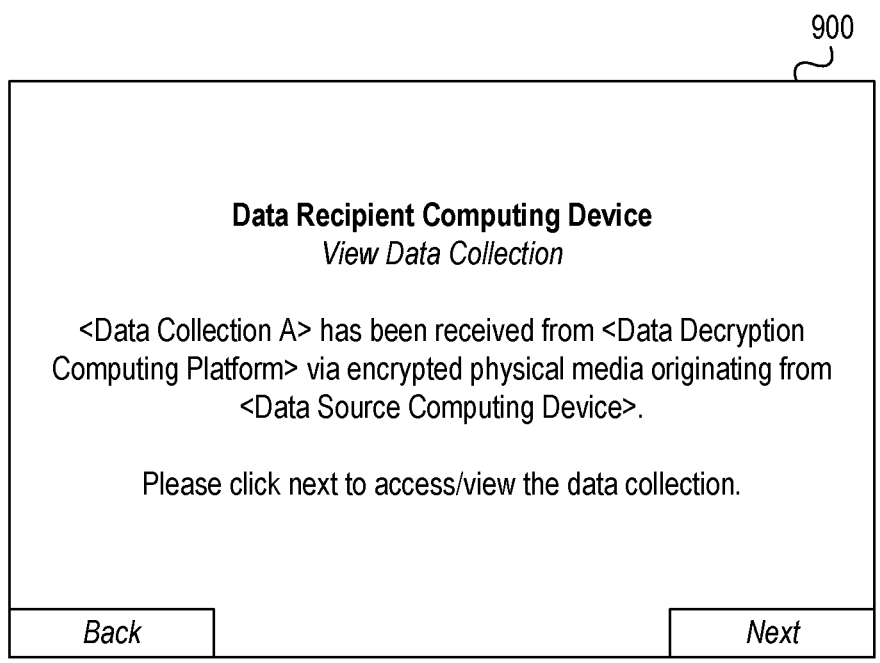

At step 719, data recipient computing device 650 may receive the data collection from data decryption computing platform 640. For example, at step 719, data recipient computing device 650 may receive part or all of the data collection from data decryption computing platform 640 and/or may receive access to part or all of the data collection from data decryption computing platform 640 (e.g., in instances in which data decryption computing platform 640 hosts the data collection). At step 720, data recipient computing device 650 may present one or more graphical user interfaces associated with the data collection received from data decryption computing platform 640. For example, at step 720, data recipient computing device 650 may present one or more graphical user interfaces, such as one or more graphical user interfaces similar to graphical user interface 900, which is depicted in FIG. 9. As seen in FIG. 9, graphical user interface 900 may include one or more controls and/or other elements that identify the data collection that has been received, along with the source of the data collection (e.g., data source computing device 610) and the decryption/reassembly platform (e.g., data decryption computing platform 640), as well as one or more controls and/or other elements that enable a user of data recipient computing device 650 to access and/or view the data collection.

Subsequently, one or more steps of the example event sequence may be repeated with the same and/or different systems and/or devices to facilitate the secure transfer of one or more other data collections. In one or more alternative arrangements, features similar to those described above may be extended to provide cloud-based secure data transfer functions. For instance, in such cloud-based embodiments, actual data from a data collection may be decoy data to produce a secure dataset that in turn may be encrypted to produce an encrypted dataset, similar to how data encryption computing platform 620 may produce such an encrypted dataset by combining actual data with decoy data in the example event sequence discussed above. Subsequently, such an encrypted dataset may be transmitted via a network or cloud-based connection to one or more recipient systems and/or devices, such as data decryption computing platform 640, to facilitate a secure data transfer.

Figure 10:
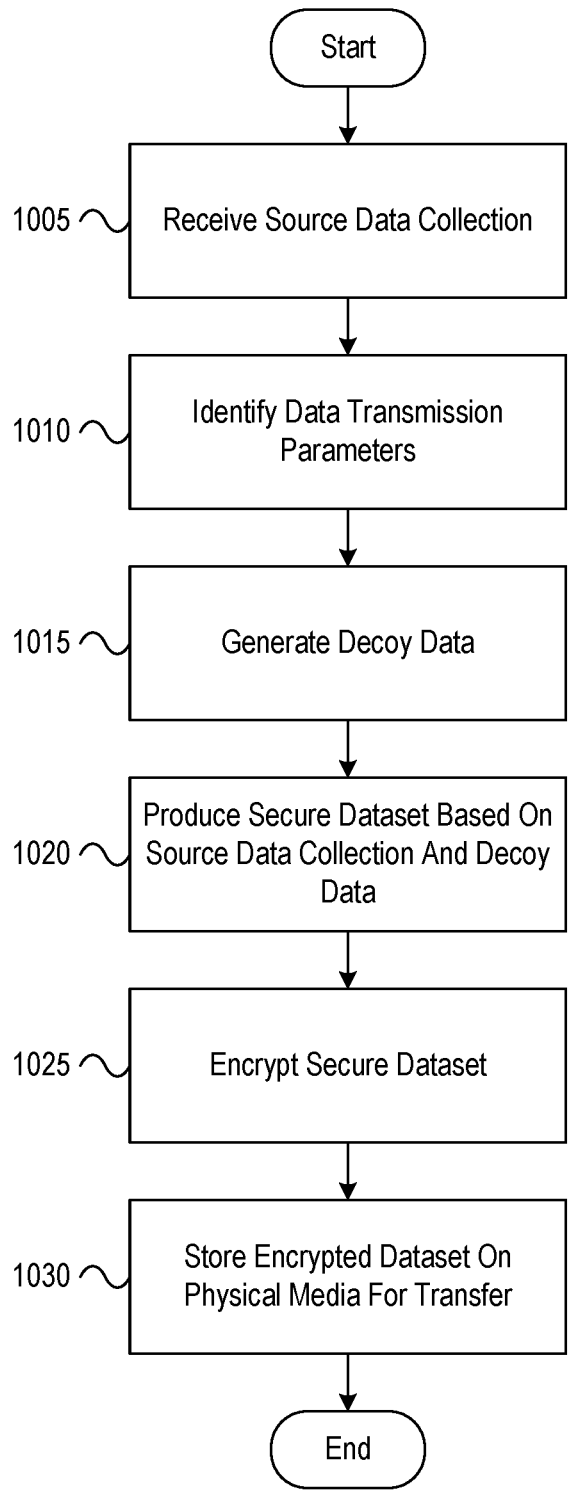
FIG. 10 depicts an illustrative method for ensuring information security in data transfers by utilizing decoy data in accordance with one or more example embodiments.

FIG. 10 depicts an illustrative method for ensuring information security in data transfers by utilizing decoy data in accordance with one or more example embodiments. Referring to FIG. 10, at step 1005, a computing platform having at least one processor, a communication interface, and memory storing instructions may receive, via the communication interface, from a data source computing device, a source data collection for a secure physical-storage-media data transfer. At step 1010, based on receiving the source data collection for the secure physical-storage-media data transfer from the data source computing device, the computing platform may identify one or more transmission parameters associated with the secure physical-storage-media data transfer. At step 1015, the computing platform may generate decoy data for the secure physical-storage-media data transfer based on the one or more transmission parameters associated with the secure physical-storage-media data transfer. At step 1020, the computing platform may produce a secure dataset for the secure physical-storage-media data transfer by combining the decoy data generated for the secure physical-storage-media data transfer and the source data collection received from the data source computing device. At step 1025, the computing platform may encrypt the secure dataset based on the one or more transmission parameters associated with the secure physical-storage-media data transfer to produce an encrypted dataset for the secure physical-storage-media data transfer. At step 1030, after encrypting the secure dataset based on the one or more transmission parameters associated with the secure physical-storage-media data transfer to produce the encrypted dataset for the secure physical-storage-media data transfer, the computing platform may store the encrypted dataset on one or more physical media.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
at least one processor;
a communication interface;
memory storing instructions that, when executed by the at least one processor, cause the computing platform to:
receive, via the communication interface, from a data source computing device, a source data collection for a secure physical-storage-media data transfer;
based on receiving the source data collection for the secure physical-storage-media data transfer from the data source computing device, identify one or more transmission parameters associated with the secure physical-storage-media data transfer;
generate decoy data for the secure physical-storage-media data transfer based on the one or more transmission parameters associated with the secure physical-storage-media data transfer;
produce a secure dataset for the secure physical-storage-media data transfer by combining the decoy data generated for the secure physical-storage-media data transfer and the source data collection received from the data source computing device;
encrypt the secure dataset based on the one or more transmission parameters associated with the secure physical-storage-media data transfer to produce an encrypted dataset for the secure physical-storage-media data transfer; and
after encrypting the secure dataset based on the one or more transmission parameters associated with the secure physical-storage-media data transfer to produce the encrypted dataset for the secure physical-storage-media data transfer, store the encrypted dataset on one or more physical media,
wherein storing the encrypted dataset on the one or more physical media comprises storing different portions of the encrypted dataset on two or more separately shippable physical media, wherein the different portions of the encrypted dataset stored on the two or more separately shippable physical media are configured to be decrypted and reassembled into the source data collection by a data decryption computing platform,
wherein producing the secure dataset for the secure physical-storage-media data transfer comprises adding one or more header tags to the decoy data generated for the secure physical-storage-media data transfer,
wherein the one or more header tags identify the decoy data generated for the secure physical-storage-media data transfer as noise data to be discarded by a data decryption computing platform when decrypting the encrypted dataset stored on the one or more physical media, and
wherein the one or more header tags cause the data decryption computing platform to identify and delete the decoy data from a decrypted dataset produced by the data decryption computing platform based on the two or more separately shippable physical media.

2. The computing platform of claim 1, wherein the memory stores additional instructions that, when executed by the at least one processor, cause the computing platform to:
based on storing the encrypted dataset on the one or more physical media, generate a notification indicating that the one or more physical media are ready to be transferred to a destination system; and
send, via the communication interface, to a data transfer administrative computing device, the notification indicating that the one or more physical media are ready to be transferred to the destination system to initiate a physical transfer of the one or more physical media.

3. The computing platform of claim 1, wherein the one or more transmission parameters associated with the secure physical-storage-media data transfer specify a quantity of physical media to be used in the secure physical-storage-media data transfer.

4. The computing platform of claim 1, wherein the one or more transmission parameters associated with the secure physical-storage-media data transfer specify an encryption method to be used in the secure physical-storage-media data transfer.

5. The computing platform of claim 1, wherein producing the secure dataset for the secure physical-storage-media data transfer comprises adding a catalog to the secure dataset, wherein the catalog identifies the decoy data generated for the secure physical-storage-media data transfer as noise data to be discarded by the data decryption computing platform when decrypting the encrypted dataset stored on the one or more physical media.

6. The computing platform of claim 1, wherein producing the secure dataset for the secure physical-storage-media data transfer comprises inserting the decoy data generated for the secure physical-storage-media data transfer at one or more predetermined locations in the secure dataset based on specifications associated with a predetermined recipient of the one or more physical media.

7. The computing platform of claim 1, wherein storing the encrypted dataset on the one or more physical media comprises storing the encrypted dataset on one or more compact discs.

8. The computing platform of claim 1, wherein storing the encrypted dataset on the one or more physical media comprises storing the encrypted dataset on one or more flash drives.

9. The computing platform of claim 1, wherein storing the encrypted dataset on the one or more physical media comprises storing the encrypted dataset on one or more hard drives.

10. The computing platform of claim 1, wherein storing the encrypted dataset on the one or more physical media comprises storing the encrypted dataset on one or more magnetic tapes.

11. A method comprising:
at a computing platform comprising at least one processor, a communication interface, and memory:
receiving, by the at least one processor, via the communication interface, from a data source computing device, a source data collection for a secure physical-storage-media data transfer;

based on receiving the source data collection for the secure physical-storage-media data transfer from the data source computing device, identifying, by the at least one processor, one or more transmission parameters associated with the secure physical-storage-media data transfer;

generating, by the at least one processor, decoy data for the secure physical-storage-media data transfer based on the one or more transmission parameters associated with the secure physical-storage-media data transfer;

producing, by the at least one processor, a secure dataset for the secure physical-storage-media data transfer by combining the decoy data generated for the secure physical-storage-media data transfer and the source data collection received from the data source computing device;

encrypting, by the at least one processor, the secure dataset based on the one or more transmission parameters associated with the secure physical-storage-media data transfer to produce an encrypted dataset for the secure physical-storage-media data transfer; and after encrypting the secure dataset based on the one or more transmission parameters associated with the secure physical-storage-media data transfer to produce the encrypted dataset for the secure physical-storage-media data transfer, storing, by the at least one processor, the encrypted dataset on one or more physical media, wherein storing the encrypted dataset on the one or more physical media comprises storing different portions of the encrypted dataset on two or more separately shippable physical media, wherein the different portions of the encrypted dataset stored on the two or more separately shippable physical media are configured to be decrypted and reassembled into the source data collection by a data decryption computing platform, wherein producing the secure dataset for the secure physical-storage-media data transfer comprises adding one or more header tags to the decoy data generated for the secure physical-storage-media data transfer, wherein the one or more header tags identify the decoy data generated for the secure physical-storage-media data transfer as noise data to be discarded by a data decryption computing platform when decrypting the encrypted dataset stored on the one or more physical media, and wherein the one or more header tags cause the data decryption computing platform to identify and delete the decoy data from a decrypted dataset produced by the data decryption computing platform based on the two or more separately shippable physical media.

12. The method of claim 11, comprising:

based on storing the encrypted dataset on the one or more physical media, generating, by the at least one processor, a notification indicating that the one or more physical media are ready to be transferred to a destination system; and sending, by the at least one processor, via the communication interface, to a data transfer administrative computing device, the notification indicating that the one or more physical media are ready to be transferred to the destination system to initiate a physical transfer of the one or more physical media.

13. The method of claim 11, wherein the one or more transmission parameters associated with the secure physical-storage-media data transfer specify a quantity of physical media to be used in the secure physical-storage-media data transfer.

14. The method of claim 11, wherein the one or more transmission parameters associated with the secure physical-storage-media data transfer specify an encryption method to be used in the secure physical-storage-media data transfer.

15. The method of claim 11, wherein producing the secure dataset for the secure physical-storage-media data transfer comprises adding a catalog to the secure dataset, wherein the catalog identifies the decoy data generated for the secure physical-storage-media data transfer as noise data to be discarded by the data decryption computing platform when decrypting the encrypted dataset stored on the one or more physical media.

16. The method of claim 11, wherein producing the secure dataset for the secure physical-storage-media data transfer comprises inserting the decoy data generated for the secure physical-storage-media data transfer at one or more predetermined locations in the secure dataset based on specifications associated with a predetermined recipient of the one or more physical media.

17. One or more non-transitory computer-readable media storing instructions that, when executed by a computing platform comprising at least one processor, a communication interface, and memory, cause the computing platform to:

receive, via the communication interface, from a data source computing device, a source data collection for a secure physical-storage-media data transfer;

based on receiving the source data collection for the secure physical-storage-media data transfer from the data source computing device, identify one or more transmission parameters associated with the secure physical-storage-media data transfer;

generate decoy data for the secure physical-storage-media data transfer based on the one or more transmission parameters associated with the secure physical-storage-media data transfer;

produce a secure dataset for the secure physical-storage-media data transfer by combining the decoy data generated for the secure physical-storage-media data transfer and the source data collection received from the data source computing device;

encrypt the secure dataset based on the one or more transmission parameters associated with the secure physical-storage-media data transfer to produce an encrypted dataset for the secure physical-storage-media data transfer; and after encrypting the secure dataset based on the one or more transmission parameters associated with the secure physical-storage-media data transfer to produce the encrypted dataset for the secure physical-storage-media data transfer, store the encrypted dataset on one or more physical media, wherein storing the encrypted dataset on the one or more physical media comprises storing different portions of the encrypted dataset on two or more separately shippable physical media, wherein the different portions of the encrypted dataset stored on the two or more separately shippable physical media are configured to be decrypted and reassembled into the source data collection by a data decryption computing platform, wherein producing the secure dataset for the secure physical-storage-media data transfer comprises adding one or more header tags to the decoy data generated for the secure physical-storage-media data transfer, wherein the one or more header tags identify the decoy data generated for the secure physical-storage-media data transfer as noise data to be discarded by a data decryption computing platform when decrypting the encrypted dataset stored on the one or more physical media, and wherein the one or more header tags cause the data decryption computing platform to identify and delete the decoy data from a decrypted dataset produced by the data decryption computing platform based on the two or more separately shippable physical media.

* * * * *